(12) United States Patent
Cao

(10) Patent No.: US 6,798,938 B1
(45) Date of Patent: Sep. 28, 2004

(54) ROUTING OPTICAL MATRIX SWITCHING METHOD AND DEVICE

(75) Inventor: Mingcui Cao, Wuhan (CN)

(73) Assignee: Huazhong University of Science & Technology (CN)

( * ) Notice: Subject to any disclaimer, the term of this patent is extended or adjusted under 35 U.S.C. 154(b) by 246 days.

(21) Appl. No.: 09/686,525

(22) Filed: Oct. 11, 2000

(30) Foreign Application Priority Data

Oct. 8, 1999 (CN) .................................... 99116685 A

(51) Int. Cl.[7] ................................................ G02B 6/26
(52) U.S. Cl. ......................... 385/17; 385/18; 385/20; 385/11; 398/65; 398/67; 398/72
(58) Field of Search .............................. 385/11, 16–24; 398/65, 66, 67, 72, 111

(56) References Cited

U.S. PATENT DOCUMENTS

| | | | | |
|---|---|---|---|---|
| 4,461,543 A | * | 7/1984 | McMahon | 385/17 |
| 4,948,229 A | * | 8/1990 | Soref | 385/16 |
| 4,989,941 A | * | 2/1991 | Soref | 385/16 |
| 5,235,452 A | * | 8/1993 | Auffret et al. | 359/125 |
| 5,771,320 A | * | 6/1998 | Stone | 385/16 |
| 6,134,358 A | * | 10/2000 | Wu et al. | 385/16 |

FOREIGN PATENT DOCUMENTS

JP  3-204621 A1 * 1/1990 ............. G02F/1/31

* cited by examiner

*Primary Examiner*—Brian Healy
*Assistant Examiner*—Kevin S Wood
(74) *Attorney, Agent, or Firm*—Knobbe Martens Olson & Bear LLP

(57) ABSTRACT

The switching method is constituted with a novel nonblocking routing optical crossbar network system. It includes two parts: one is a routing fan-out unit which provides N parallel optical channels for each of M input light beams, and the other is a routing combination unit in which M parallel optical channels that have the same output port, are routing combined into one optical parallel channel of N parallel output channels by the routing fan-in network. According to the method of the present invention, the optical module of M×N ($M=2^m$, $N=2^n$, m and n are nature numbers) routing matrix switching can be developed.

6 Claims, 13 Drawing Sheets

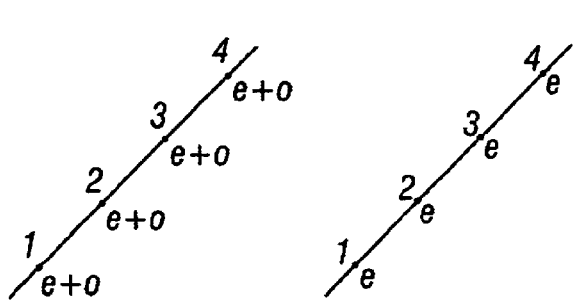
FIG. 7A  FIG. 7B  FIG. 7C
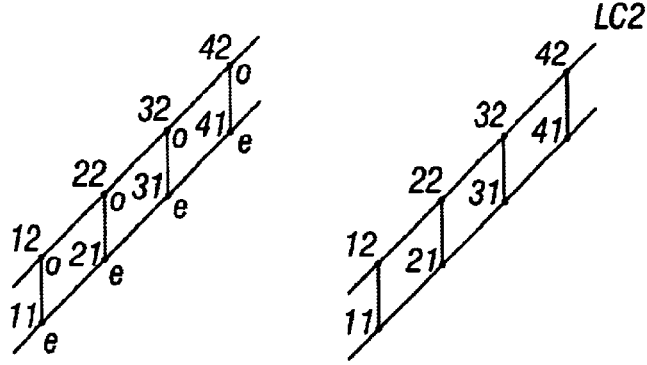
FIG. 7D  FIG. 7E  FIG. 7F

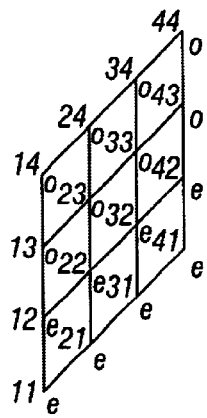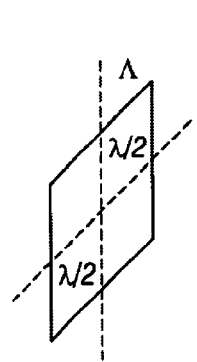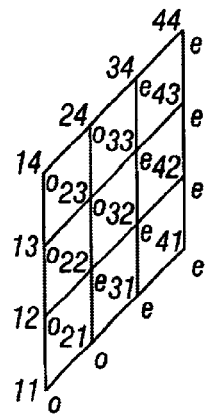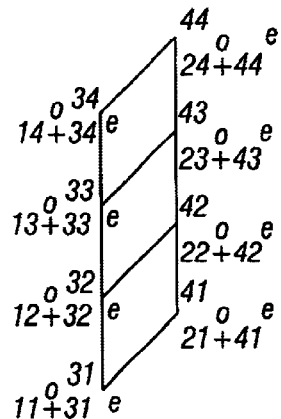
FIG. 11A    FIG. 11B    FIG. 11C    FIG. 11D
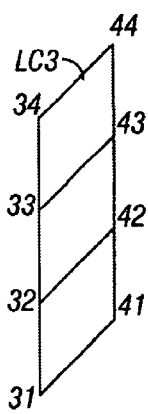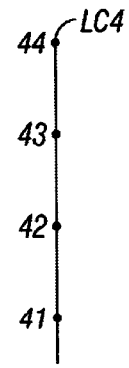
FIG. 11E    FIG. 11F    FIG. 11G    FIG. 11H

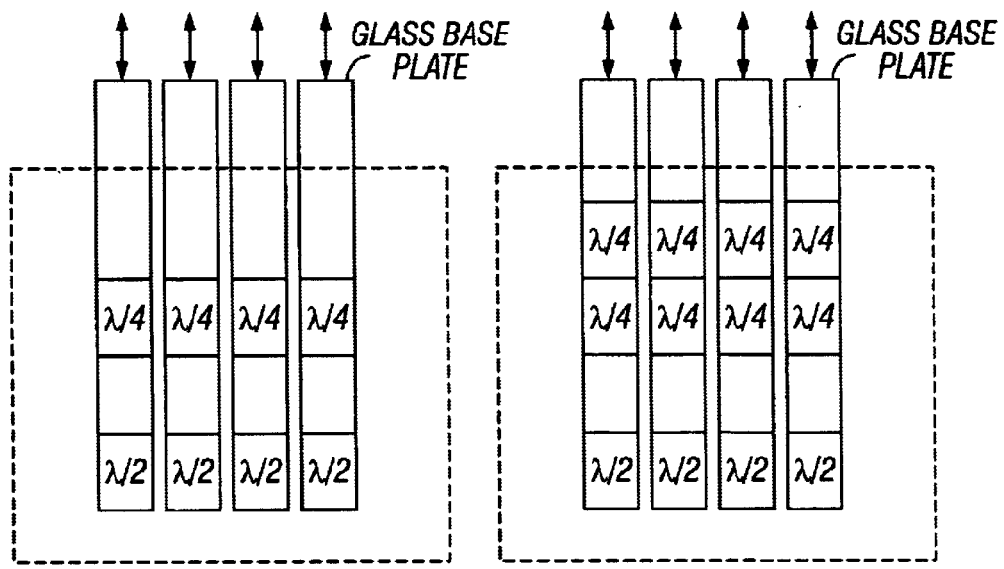
*FIG. 15A*  *FIG. 15B*
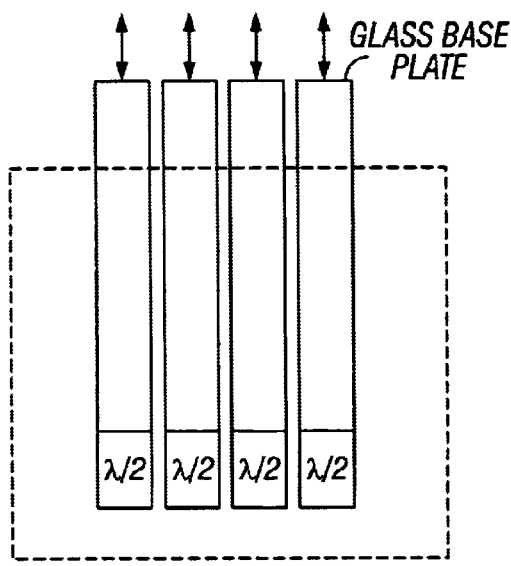
*FIG. 15C*

ROUTING OPTICAL MATRIX SWITCHING METHOD AND DEVICE

TECHNICAL FIELD

The present invention relates to a routing optical matrix switching method and a device for an optical communication. More specifically, the present invention relates to a routing optical matrix switching method and a device for WDM. optical communication networks.

BACKGROUND ART

Recently, all developed countries in the world are preparing to establish WDM high-speed fiber communication networks. So those countries need a great number of all-optical cross connections and fiber protection switch-equipment, optical adding/dropping multiplex OADM and optical wavelength route OXC equipment and the like, of which the most vital device is optical matrix switching device. However, optical matrix switching devices available on the market are switched between input fibers and output fibers with high precision machine-driving fiber or driving optical prism, referring to the product catalogs of The USA Dicon fiber Optics Inc, E-TEK Inc and Canada JDS, and also seeing "Optical Components for WDM Lightwave Networks". Proceedings of The IEEE, Vol.85, No.8, p1274–1307, August 1997. The switching rate of the above mentioned machine-driving optical matrix switching is about 0.5–0.7 second. It is difficult and complex to perform M×N all-optical cross-connection, although easily achieving 1×N or 2×N all-optical cross connection. The M×N all-optical cross-connection with the method of conventional optical Crossbar switching network must cause very large insertion loss in the processes of 1×N fan-out and M×1 fan-in. It is a problem to be solved urgently in this field to develop a novel all-optical matrix switching, which is suitable for all-optical cross connect equipment, optical adding/dropping multiplex OADM and optical wavelength route OXC equipment in high-speed D-WDM optical communication network.

DISCLOSURE OF INVENTION

The purpose of the present invention is to provide a simple and flexible M×N optical matrix switching method and device, where $M=2^m$, $M=0,1,2\ldots$; $N=2^n$, $n=0,1,2\ldots$, to greatly reduce the insertion loss of signal beam between input fiber and output fiber and to increase its switching rate. To realize the object, the present invention puts forward a routing optical matrix switching method and device, thereof.

The M×N optical matrix switching method of the present invention comprises steps as:

converting M divergent signal beams into collimated light beams;

converting said M collimated random polarization signal beams into linear polarization signal beams;

said linear polarization signal beams are transmitted with routing parallel optical channel in non-block crossbar network, wherein each of M input signal beams in the x-direction is provided with N parallel optical channels in the y-direction, to construct M×N parallel transmission optical channels;

routing combining said M parallel transmission optical channels of each group in said x-direction into one parallel optical channel, to construct N parallel output optical channels in y-direction;

for an unidirection routing matrix switching device, coupling directly signal beams transmitted in said N output parallel optical channels into N output fibers;

for a bidirection matrix switching device, reverting N linear polarization beams output from said N output parallel optical channels into N random polarization signal beams; and coupling said N random polarization signal beams into N output fibers in parallel; and in above steps, $M=2^m$, $N=2^n$, m and n are nature numbers.

Based on the above-mentioned M×N optical matrix switching method, a bidirection and an unidirection optical matrix switching devices can be developed. Bidirection and unidirection optical matrix switching devices are structured with a routing parallel optical channel and a parallel optical channel routing combination, wherein a. routing parallel optical channel unit, comprising an optical collimated unit of one dimension fiber array, a parallel plane crystal unit and a routing parallel optical channel unit, wherein the optical collimated unit of one dimension fiber array includes a base-plate with M parallel V-grooves, in which micro-capillary with fiber tails and gradient index lenses are closely leant against front and back of each V-grooves to construct M parallel optical channels, respectively;

the parallel plane crystal unit are composed of four rectangle parallel plane crystals and two wavelength plates, which are arranged in order of the first rectangle parallel plane crystal, the first wavelength plate, the second rectangle parallel plane crystal, the second wavelength plate, and the third and the fourth rectangle parallel plane crystals overlapped with each other; therein, the first wavelength plate is $\lambda/2$ wavelength plate, the half upper layer of the second wavelength plate is a $\lambda/2$ wavelength plate and the other half lower layer is a glass base plate of parallel plane; and the routing parallel optical channel unit comprises n stages of optical switching arrays and crystal prism units, in which each stage is composed of, in order, one optical switching array and one crystal prism; and b. the routing combination unit of parallel optical channel, which is coupled with the routing parallel optical channel unit via optical path in space, the bidirection optical matrix switching device orderly includes a $\lambda/2$ wavelength plate array, a routing combination unit of parallel optical channel, an parallel plane crystal unit; unidirection optical matrix switching device orderly includes $\lambda/2$ wavelength plate array, a routing combination unit of, parallel optical channel, and a coupling unit of one dimension fiber array, moreover the last stage of optical switching array in routing combination unit of parallel optical channel and a parallel plane crystal unit are removed, wherein the $\lambda/2$ wavelength plate array is structured by arranging two pieces of $\lambda/2$ wavelength plates and of glass base-plates, in the same size, into square crossing;

the routing combination unit of parallel optical channels comprises m stages of crystal prisms and optical switching arrays; in which each stage is composed of, in order, one optical switching array and one crystal prism; the parallel plane crystal unit is composed of four rectangle parallel plane crystals and two wavelength plates, which are the same components as those in the parallel plane crystal unit of the routing parallel optical channel unit, but of which the collocation order is equal to rotate the parallel plane crystal unit in the routing parallel optical channel unit over 180° along the axis direction of and over 90° along the radial direction of light path; and the coupling unit of one dimension fiber array comprises a base-plate with N parallel V-grooves, in which gradient index micro-lenses and microcapillary with fiber tails are closely leant against front and back of each V-grooves, respectively, to construct N parallel optical channels; in above steps, $M=2^m$, $N=2^n$, m, n is nature number.

Said optical matrix-switching device is further characterized as:

(1) in said optical collimated unit of one dimension fiber array, the spacing of V-grooves and the outer diameter of gradient index micro-lenses are all equal to the outer diameter d0 of microcapillary with fiber tails, and a flat base as a cover plate is formed and solidified on the top surface of the entire unit;

(2) in said parallel plane crystal unit, the first and the second rectangle parallel plane crystals are identical crystals with the same size, and the third and the fourth rectangle parallel plane crystals, of which the crystal axes are up-down symmetrical with each other, are identical crystals with the same size as well;

(3) in said routing parallel optical channel unit, each stage of optical switching arrays has $2^m \times 2^i$ cells, where i=0,1,2,3 ... (n−1), and each cell, under the external control, can exhibit one of two states corresponding to the natures of glass medium and λ/2 wavelength plate, or one of three states corresponding to the natures of glass medium, λ/2 wavelength plate and λ/4 wavelength plate;

(4) in said routing combination unit of parallel optical channel, each stage of optical switching arrays has $2^j \times 2^n$ cells, where j=m−1, ... 2,1,0, and each cell is provided with natures of the cell mentioned in (3);

(5) said coupling unit of one dimension fiber array is structured with the same as above-mentioned in (1).

In the routing parallel optical channel unit and routing combination unit of parallel optical channel of the above-mentioned optical matrix switching device, said optical switching array can be an optical switching of movable wavelength plate array, or a liquid-crystal optical switching device as well. The crystal prism can be a trapezoid polarization prism as well as a birefringence crystal prism. In comparison with a bidirection optical matrix-switching device, an unidirection optical matrix-switching device is simple, moreover, both the last stage of optical switching array and the parallel plane crystal units. can be left out in routing combination unit of parallel optical channels.

The M×N optical matrix switching method and device of the present invention have the following various advantages: low insertion loss, low polarization dependent loss, low cross-talk, simplified, flexible, and scalable. The M×N optical matrix switching device can widely be used for varieties of all-optical cross connection, optical add/drop OADM and optical wavelength route OXC equipment in the field of WDM optical communication.

DESCRIPTION OF DRAWINGS

FIGS. 2a(A) and 2a(B) are schematic diagram showing an unidirection 4×4 optical matrix switching device.

FIG. 7 illustrates polarized orientations of various signal beams in the part of routing parallel optical channel.

FIG. 11 illustrates polarized orientations of various signal beams and a control procedure in routing combination unit of parallel optical channel.

FIG. 15 illustrates the structure of optical switching device with movable wavelength plate array.

EMBODIMENT

A 4×4 optical matrix switch, as one embodiment of the present invention, will be described hereinafter with reference to the drawings.

Figure 1:
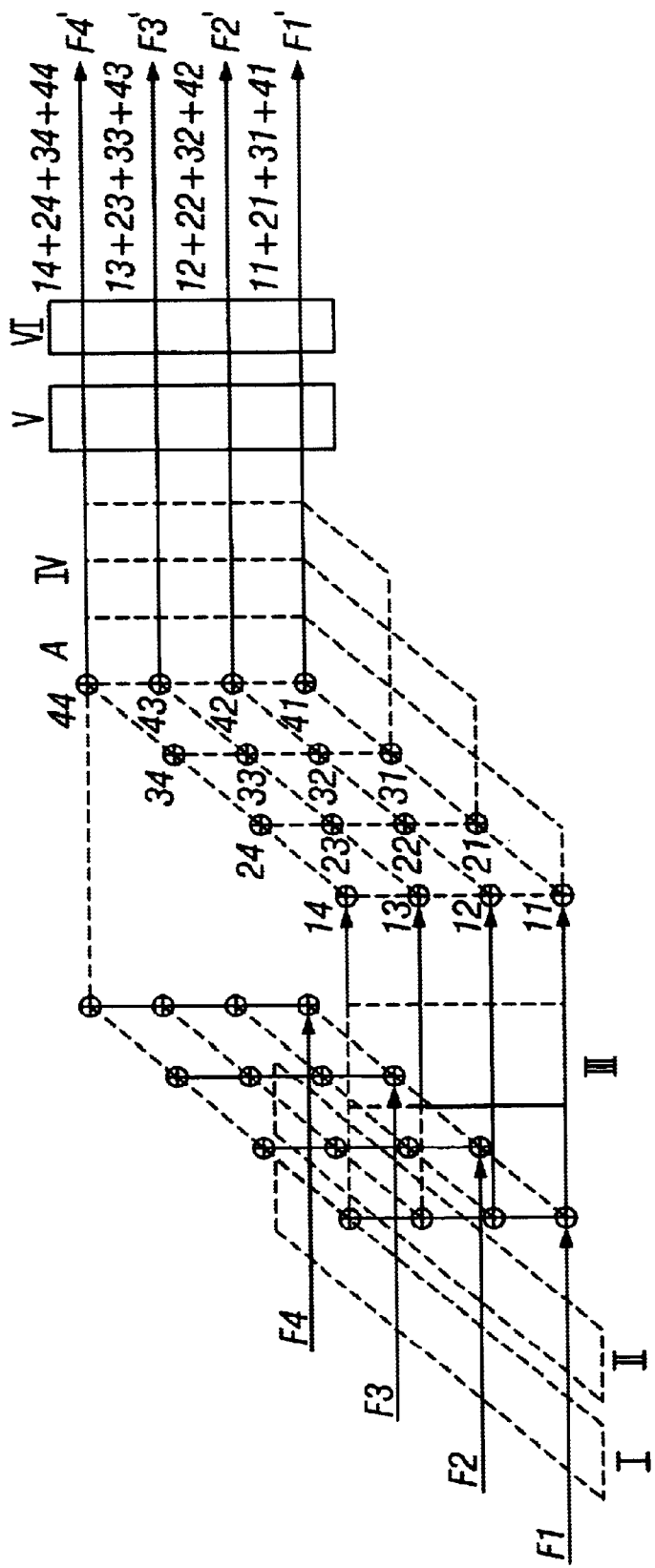
FIG. 1 is a schematic diagram showing a 4×4 optical matrix switching of the present invention.

In FIG. 1, four divergent signal beams F1, F2, F3, F4 are converted into collimated parallel light beams via an optical collimated unit of one dimension fiber array I. And then become linear polarization light beams through parallel plane crystal unit II, and further each signal beam is provided with four parallel optical channels in the y direction after passing through routing parallel optical channel unit III. Thus, there are totally 4×4 parallel output optical channels available for four input signal beams. In the routing combination unit of parallel optical channel, having passed through a λ/2 is wavelength plate array A and a routing combination unit of parallel optical channel IV, four parallel output optical channels in the x direction are, routing combined into one optical channel, such as a routing combination 13+23+33+43; and then through a reverse parallel plane crystal unit V and a coupling unit of one dimension fiber array VI, the routing combining signal beam is regenerated as original random polarization signal beams and coupled into output fiber F3' to output.

Figure 2A:
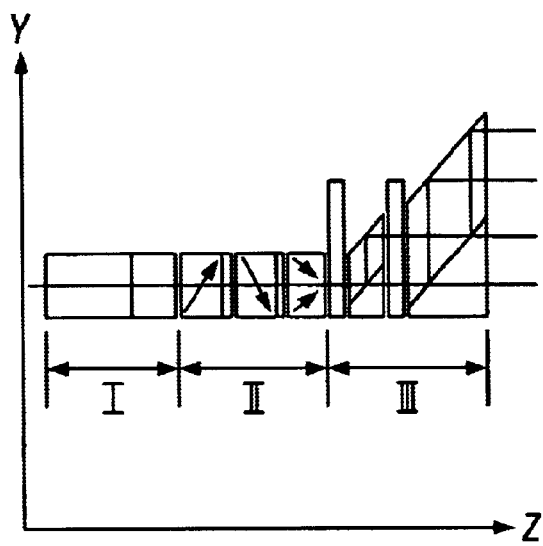
FIGS. 2(A) and 2(B) are schematic diagram showing a bidirection 42×4 optical matrix switching device.
Figure 2A:
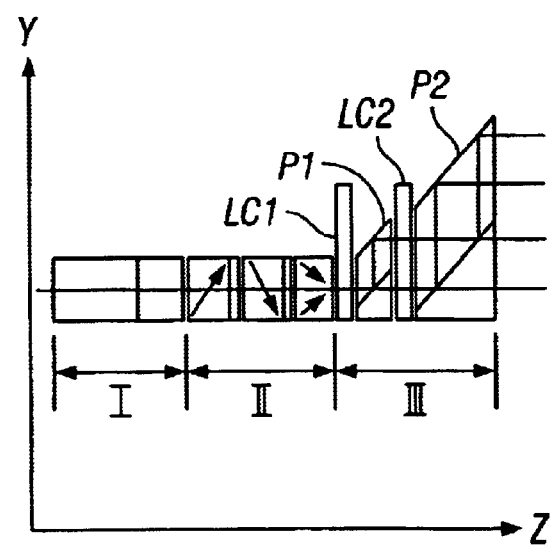

FIG. 2(A) shows the part of routing parallel optical channel, where I, II, and III are the same as the above mentioned.

Figure 2B:
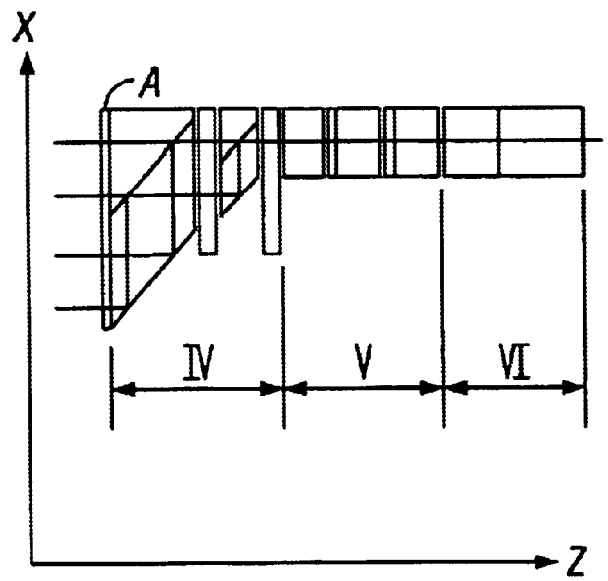
Figure 2B:
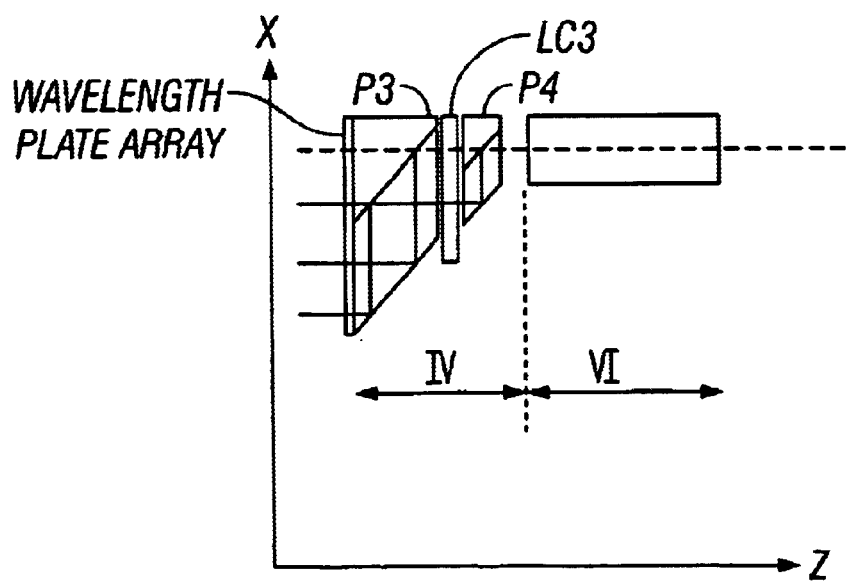

FIG. 2(B) shows the part of parallel optical channel routing combination in a bidirection optical matrix switching device, where A, IV, V and VI are also the same as the previously mentioned.

FIG. 2a(A) shows the part of routing parallel optical channel in an unidirection optical matrix-switching device, which is the same as that FIG. 2(A) in the bidirection optical matrix switching. FIG. 2b(B) shows the part of a routing combination of parallel optical channels in a unidirection optical matrix-switching, obtained by removing both the last stage of optical switching array from unit IV and the parallel plane crystal unit V in FIG. 2(B).

Figure 3:
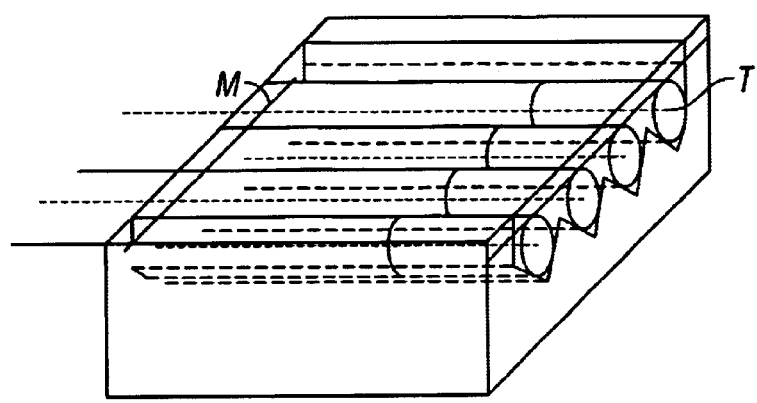
FIG. 3 is a schematic diagram showing an optical collimated unit of one dimension fiber array.

FIG. 3 shows a 4×1 optical collimated unit of one dimension fiber array and a couple unit of fiber array. Having stripped its cladding, fiber is inserted into the micro-capillary M with outside diameter $d_0$ and solidified with glue, and then its end surfaces are polished and are make AR coating to perform the micro-capillary with fiber tail. A collimated GRIN micro-lenses T, which is provided with an outer diameter equal to that of the micro-capillary and the same wavelength as communication signal beam, is selected and arranged one by one inside the same one V-grooves. Thus, a signal beam from one fiber is converted into a collimated light beam. On M V-grooves with spacing do, four pairs of micro-capillaries with fiber tail and GRIN micro-lenses are arranged parallel, and the top are adhered and solidified by pressing base plate. Thus a 4×1 optical collimated unit of one dimension fiber array and a couple unit of fiber array are made. It is made that signal light beams from 4×1 fibers convert into 4×1 collimated parallel light beam array of one dimension, or 4×1 collimated parallel light beam array can be high-effectively coupled into a coupling unit of 4×1 fibers array respectively.

Figure 4:
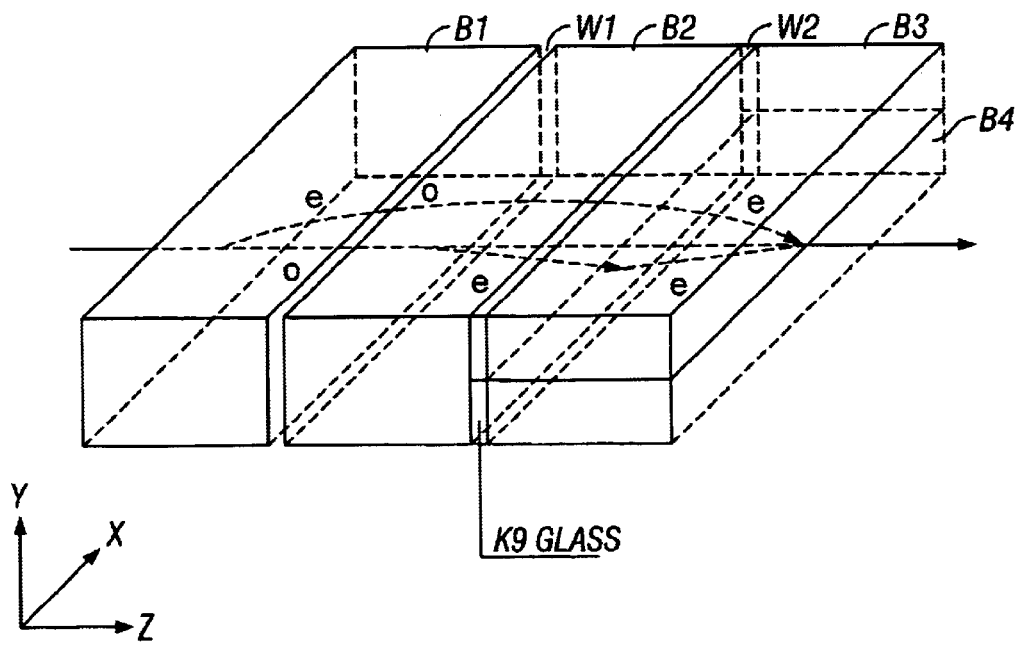
FIG. 4 is a schematic diagram showing a parallel plane crystal unit.

FIG. 4 is shows a parallel plane crystal unit composed of four rectangle parallel plane crystals $B_1$, $B_2$, $B_3$, $B_4$ and two wavelength plates $W_1$, $W_2$. Firstly, a one-dimension array of four collimated beams entering crystal $B_1$ is split into ordinary polarization and extraordinary polarization light beams (o-signal beam and e-signal beam) to pass through crystal $B_1$. The e-beam propagates through crystal $B_1$ in upward-deflection direction, and is separated with space$\Delta$ apart from o-beam on the output end surface in upward vertical direction, and then o-beam and e-beam propagate in parallel. Secondly, for input light beams, $\lambda/2$ Wavelength plate $W_1$ can convert o-beam into e-beam, and e-beam into o-beam. The o-beam passes through crystal $B_2$ in straight line, and e-beam propagates in downward-deflection direction through crystal $B_2$ and is separated with space $2\Delta$ apart from the Abeam on the output end surface of $B_2$ in downward vertical direction. And then, o-beam and e-beam propagate in parallel. The wavelength plate W2 is combined with both upper half and lower half parts with the same thickness, in which the upper half part is $\lambda/2$ wavelength plate and the lower half part is a glass base plate of parallel plane. Thus, the o-beam in the upper half part of the wavelength plate W2 is changed into an e-beam and the e-beam in the lower half part of the wavelength plate W2 keep unchanged, to realize the parallel propagation of all e-beams. The crystals $B_3$ and $B_4$ are of the same kind and of the same thickness. The crystal axis orientation of crystals $B_3$ and $B_4$ are symmetrical with each other, and the bottom surface of crystals $B_3$ is totally overlapped with the upper s surface of crystal $B_4$. The e-beam in the upper half vertically incidents into the upper crystal B3, then is downwards deflected near to the bottom surface of the upper crystal and finally exits from the output end surface. The e-beam in the lower half vertically incidents into the bottom crystal B4, then is upwards deflected near to the upper surface of the bottom crystal and finally exits from the output end surface. Thus, both e-beams in the upper and the bottom crystals are incorporated into almost-one beam of e-polarization light to propagate in parallel. The crystal unit makes four collimated random polarization beams from four fibers to converts into four collimated linear polarization light beams of almost-one beam.

Figure 5:
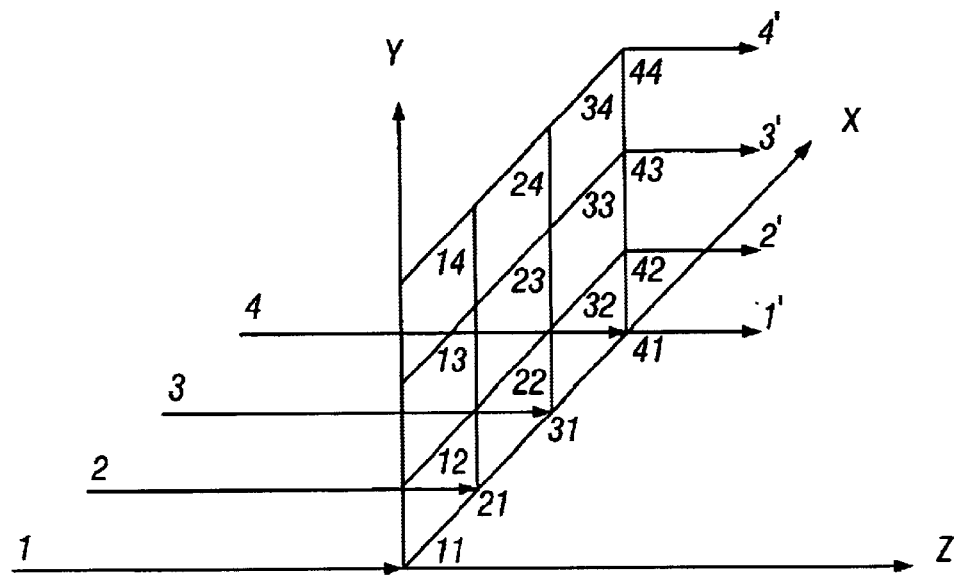
FIG. 5 is a schematic diagram showing a 4×4 routing parallel optical channel unit of the present invention.

A schematic diagram of a 4×4 routing parallel optical channel unit of the present invention is shown as in FIG. 5. Four collimated input signal light beams 1, 2, 3 and 4 from a 1×4 fiber array are arranged in the x direction. Having passed through a parallel plate crystal unit, four random polarization beams are converted complete linear e-polarization beams. In an optical system, each input signal beam is provided with four parallel optical channels placed in the y direction. Output ends with order numbers corresponding to each input signal light beam, called the output number ends, are 11, 12, 13, 14; 21, 22, 23, 24; 31, 32, 33, 34; 41, 42, 43, 44. Responding to control signals, each signal beam can select one of four relevant optical channels to reach the output number end.

Figure 6:
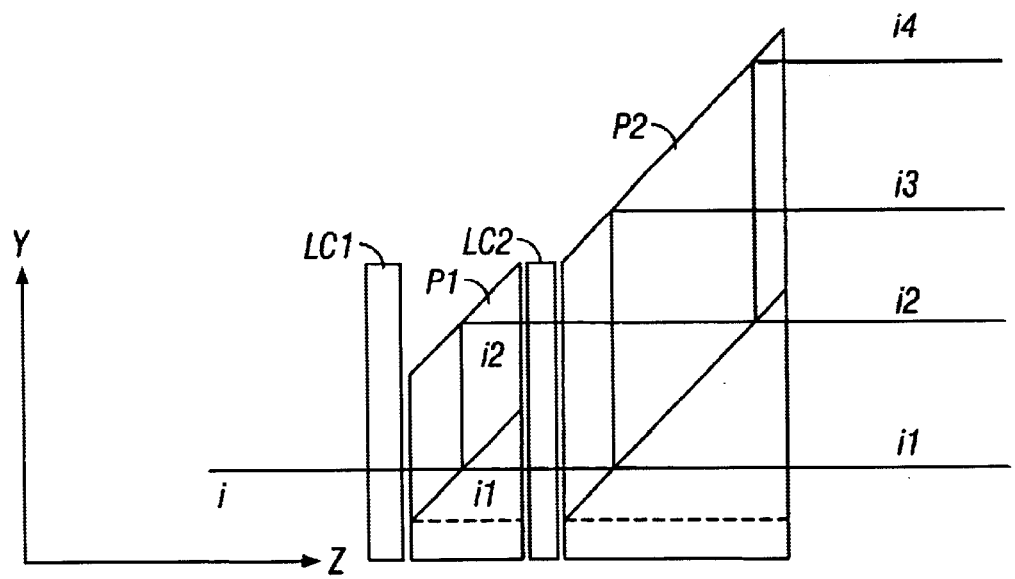
FIG. 6 is a schematic: diagram showing a routing parallel optical channel unit of using a trapezoid polarization prism as a crystal prism.

FIG. 6 shows a 4×4 routing parallel optical channel unit consisting of two s trapezoid polarization prisms P1, P2 and two pieces of optical switching array LC1, LC2. In FIG. 6, i (i=1,2,3,4) indicates a signal beam arranged in the x direction. The procedure of its routing to respective output number end is described as follows. The polarizing orientation of e signal beam 1, 2, 3 and 4, generated from the unit for converting the random polarization light into the complete polarization light, is in conformity to that of p beam inside trapezoid polarization prism, referred to as vertical polarization. The polarizing orientation of o signal beam in the crystal is in conformity to that of s light beam within trapezoid polarization prism, referred to as horizontal polarization. Optical switching array LC1 is an array of 4×1 cells, expressed as $[M_{11}^{(1)}\ M_{31}^{(1)}\ M_{41}^{(1)}]$. Optical switching array LC2 is an array of 4×2 cells, expressed as $$\begin{bmatrix} M_{12}^{(2)} & M_{22}^{(2)} & M_{32}^{(2)} & M_{42}^{(2)} \\ M_{11}^{(2)} & M_{21}^{(2)} & M_{31}^{(2)} & M_{41}^{(2)} \end{bmatrix}.$$

Under the control of an external control system, each cell of optical switching array can be in two states corresponding to behaviors of glass medium and $\lambda/2$ wavelength plate, or three states corresponding to natures of glass medium, $\lambda/2$ wavelength plate and $\lambda/4$ wavelength plate. A trapezoid polarization prism $P_1$ can provide two parallel optical channels for an input parallel signal beam i in the y direction. The signal beam i is controlled to select one or both of parallel optical channel i1 and i2 for transmission. When a signal light beam i passes through the cell $M_{i1}^{(1)}$, if the cell $M_{i1}^{(1)}$ of switching LC1 behaves as glass medium which keeps e-beam no change, signal light beam i will be transmitted via the optical channel i1. If the cell M of switching LC1 behaves as a $\lambda/2$ wavelength plate for converting an e-beam into an o-beam, signal light beam i will be transmitted via the optical channel i2. If the cell $M_{i1}^{(1)}$ of switching LC1 behaves as a $\lambda/4$ wavelength plate, signal light beam i will be split into two signal beams of the equal intensity and be transmitted via two parallel optical channels i1 and i2, respectively. The trapezoid polarization prism $P_2$ makes it available to transmit each of input signal light beams i1 and i2 via two parallel optical channels in the y direction, i1—i1, i3, and i2—i2, i4. When a cell $M_{i1}^{(2)}$ of switching LC2 behaves as glass medium, e-beam keeps its own polarization orientation no change, and thus signal light beam i1 will be transmitted via the optical channel i1. When the cell M behaves as a $\lambda/2$ wavelength plate for converting an e-beam into an o-beam, signal light beam i1 will be transmitted via the optical channel i3. When the cell $M_{i1}^{(2)}$ behaves as a $\lambda/4$ wavelength plate, signal light beam i1 will be split into two signal light beams of the equal intensity and simultaneously be transmitted via two parallel optical channels i1 and i3, respectively. Similarly, when a cell $M_{i1}^{(2)}$ of switching LC2 behaves as glass medium, the o-beam keeps its own polarization orientation no change, and thus signal light beam i2 will be transmitted via the optical channel i4. When the cell $M_{i1}^{(2)}$ behaves as a λ/2 wavelength plate for converting an o-beam into an e-beam, signal light beam i2 will be transmitted via the optical channel i2. When the cell $M_{i1}^{(2)}$ behaves as a λ/4 wavelength plate, signal light beam i2 will be split into two signal light beams of the equal intensity and simultaneously be transmitted via two parallel optical channels i2 and i4, respectively Therefore, two stages of trapezoid polarization prim $P_1$ and $P_2$ can establish four parallel optical channels available for any signal light beam i in the y direction. For a 4×4 optical matrix switching system, two stages of optical switching array and trapezoid polarization prim can provide four routing or widespread parallel optical channels available for any signal light beam i of the optical system.

In a 4×4 optical matrix switching device, polarization orientations of various signal beams in the routing parallel optical channel unit are illustrated in FIG. 7. FIG. 7(a) illustrates random polarization signal light beams from a fiber array. FIG. 7(b) illustrates linear polarization e-beams converted by crystal units. FIG. 7(c) illustrates the cells of optical switching LC1. FIG. 7(d) illustrates the polarization orientations of signal beams after passing through trapezoid polarization prism $P_1$. FIG. 7(e) illustrates the cells of optical switching LC2. FIG. 7(f) illustrates the polarization orientations of signal beams after passing through trapezoid polarization prism $P_2$. As shown in FIG. 7, the collimated signal beams of random polarization from a fiber array, via the unit of converting a random polarization beam into a linear polarization beam, can be formed into four collimated linear polarization e-beams, expressed as $[A_{11}^e\ A_{21}^e\ A_{31}^e\ A_{41}^e]$. The four signal light beams respectively pass through the corresponding cells of optical switching LC1 $[M_{11}^{(1)}\ M_{21}^{(1)}\ M_{31}^{(1)}\ M_{41}^{(1)}]$ and trapezoid polarization prism $P_1$, and the relative routing and broadcast procedure are expressed as follow $$\begin{bmatrix} M_{11}^{(1)}A_{11}^e & M_{21}^{(1)}A_{21}^e M_{31}^{(1)}A_{31}^e & M_{41}^{(1)}A_{41}^e \\ M_{11}^{(1)}A_{11}^e & M_{21}^{(1)}A_{21}^e M_{31}^{(1)}A_{31}^e & M_{41}^{(1)}A_{41}^e \end{bmatrix} = \begin{bmatrix} A_{21}^o & A_{22}^o & A_{32}^o & A_{42}^o \\ A_{11}^e & A_{21}^e & A_{31}^e & A_{41}^e \end{bmatrix} \quad (1)$$

A 4×2 array of collimated linear polarization signal beams $$\begin{bmatrix} A_{21}^o & A_{22}^o & A_{32}^o & A_{42}^o \\ A_{11}^e & A_{21}^e & A_{31}^e & A_{41}^e \end{bmatrix}$$

passes through the corresponding cells of optical switching LC2

$$\begin{bmatrix} M_{12}^{(2)} & M_{22}^{(2)} & M_{32}^{(2)} & M_{42}^{(2)} \\ M_{11}^{(2)} & M_{21}^{(2)} & M_{31}^{(2)} & M_{41}^{(2)} \end{bmatrix}$$

and trapezoid polarization prism $P_2$, and the relative routing and broadcast procedure are expressed as follow:

$$\begin{bmatrix} M_{12}^{(2)}A_{12}^o, & M_{22}^{(2)}A_{22}^o & M_{32}^{(2)}A_{32}^o & M_{42}^{(2)}A_{42}^o \\ M_{11}^{(2)}A_{11}^e, & M_{21}^{(2)}A_{21}^e & M_{31}^{(2)}A_{31}^e & M_{41}^{(2)}A_{41}^e \\ M_{12}^{(2)}A_{12}^o, & M_{22}^{(2)}A_{22}^o & M_{32}^{(2)}A_{32}^o & M_{42}^{(2)}A_{42}^o \\ M_{11}^{(2)}A_{11}^e, & M_{21}^{(2)}A_{21}^e & M_{31}^{(2)}A_{32}^e & M_{41}^{(2)}A_{41}^e \end{bmatrix} = \begin{bmatrix} A_{14}^o & A_{24}^o & A_{34}^o & A_{44}^o \\ A_{13}^e & A_{23}^e & A_{33}^e & A_{43}^e \\ A_{12}^e & A_{22}^e & A_{32}^e & A_{42}^e \\ A_{11}^e & A_{21}^e & A_{31}^e & A_{41}^e \end{bmatrix} \quad (2)$$

Figure 8A:
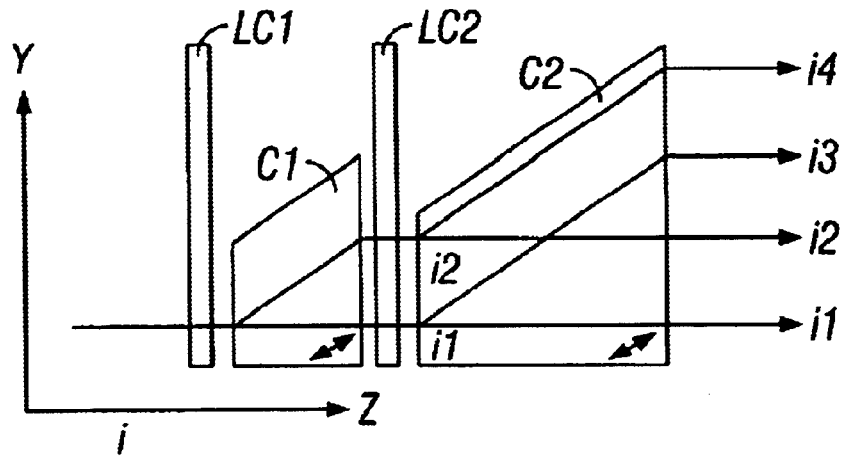
FIGS. 8(A) and 8(B) are schematic diagram showing a routing parallel optical channel unit of using a birefringence crystal prism as a crystal prism.
Figure 8B:
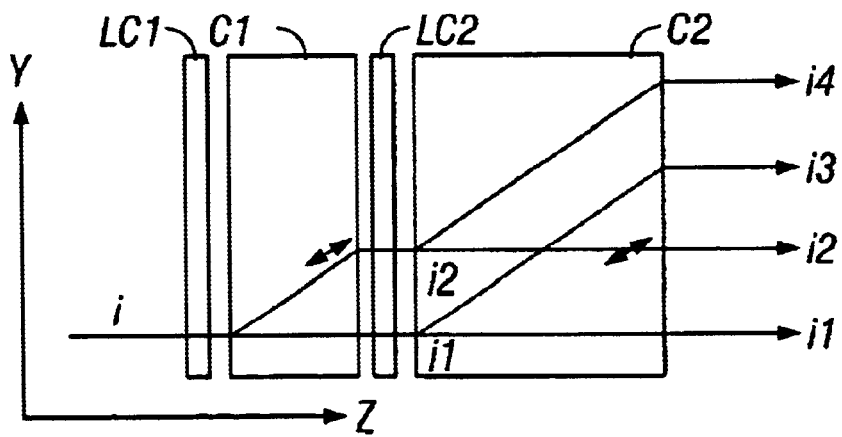

The above-mentioned routing and broadcast procedure of 4×4 parallel optical channels with trapezoid polarization prisms can be applied to a $2^m \times 2^n$ optical matrix switching system with trapezoid polarization prisms. A 2×2 optical matrix switching needs one set of trapezoid polarization prism and is optical switching array pair. A 4×4 system needs two sets, a 8×8 system needs three sets, a 2×4 system needs two sets, and a $2^m \times 2^n$ system needs n sets. A 4×4 routing parallel optical channel unit is structured with birefringence crystal prisms and optical switching arrays. A birefringence crystal prism can use trapezoid prism crystals as shown in FIG. 8(A) or rectangle parallel plane crystals as shown in FIG. 8(B). In this system, two birefringence crystal prisms $C_1$ and $C_2$ will replace two trapezoid polarization prisms $P_1$ and $P_2$ shown in FIG. 6, respectively.

Select the thickness and cut-orientation of birefringence crystals and make the crystals have properties as shown in FIGS. 8(A) and 8(B). Firstly, in a crystal $C_1$, an incident beam i is provided with two available transmission paths. If the incident beam i is an o-polarization beam, it will be transmitted along the direction of the straight-line i1. If it is an e-polarization beam, the incident beam i propagates through crystal $C_1$ in upward-deflection direction, and is deflected with spacing $d_0$ apart from the o-beam on the output end surface, and then propagates in the direction i2. As a result, two parallel optical channels for respectively transmitting o-beam and e-beam are established. Secondly, since the thickness of crystal $C_2$ is twice that of crystal $C_1$, two parallel optical channels are divided into four channels. If the light beam i1 is an o-polarization beam, it will pass through the crystal $C_2$ in straight line. If the beam i is an e-polarization beam, it propagates through crystal $C_2$ in upward-deflection direction, and is deflected with space $2d_0$ apart from the o-beam on the output end surface upwards, and then parallelly propagates in the direction i3. Similarly, the light beam i2 through the crystal $C_2$ establishes parallel optical channels i2 and i4.

In routing parallel optical channel unit with birefringence crystals, the routing principle and control method of parallel optical channels are totally the same as routing parallel optical channel system with trapezoid polarization prisms. But for two kinds of optical channel system mentioned above, respective signal beam in the parallel optical channels takes totally opposite polarization orientation. The mathematics equations of routing and broadcast procedure of 4×4 parallel optical channels are expressed as (1a) and (2b). The routing and broadcast procedure of 4×4 parallel optical channels is applicable to a $2^m \times 2^n$ optical matrix switching system with birefringence crystals.

$$\begin{bmatrix} M_{11}^{(1)}A_{11}^e & M_{21}^{(1)}A_{21}^e M_{31}^{(1)}A_{31}^e & M_{41}^{(1)}A_{41}^e \\ M_{11}^{(1)}A_{11}^e & M_{21}^{(1)}A_{21}^e M_{31}^{(1)}A_{31}^e & M_{41}^{(1)}A_{41}^e \end{bmatrix} = \begin{bmatrix} A_{12}^e & A_{22}^e & A_{32}^e & A_{42}^e \\ A_{11}^o & A_{21}^o & A_{31}^o & A_{41}^o \end{bmatrix} \quad (1a)$$

$$\begin{bmatrix} M_{12}^{(2)}A_{12}^e, & M_{22}^{(2)}A_{22}^e & M_{32}^{(2)}A_{32}^e & M_{42}^{(2)}A_{42}^e \\ M_{11}^{(2)}A_{11}^o, & M_{21}^{(2)}A_{21}^o & M_{31}^{(2)}A_{31}^o & M_{41}^{(2)}A_{41}^o \\ M_{12}^{(2)}A_{12}^e, & M_{22}^{(2)}A_{22}^e & M_{32}^{(2)}A_{32}^e & M_{42}^{(2)}A_{42}^e \\ M_{11}^{(2)}A_{11}^o, & M_{21}^{(2)}A_{21}^o & M_{31}^{(2)}A_{32}^o & M_{41}^{(2)}A_{41}^o \end{bmatrix} = \begin{bmatrix} A_{14}^e & A_{24}^e & A_{34}^e & A_{44}^e \\ A_{13}^e & A_{23}^e & A_{33}^e & A_{43}^e \\ A_{12}^o & A_{22}^o & A_{32}^o & A_{42}^o \\ A_{11}^o & A_{21}^o & A_{31}^o & A_{41}^o \end{bmatrix} \quad (2b)$$

As mentioned above, the signal beam i from an input fiber may propagate along four parallel optical channels arranged in the y direction, and then reaches the respective output order number end, 1—11, 12, 13, 14; 2—21, 22, 23, 24; 3—31, 32, 33, 34; 4—41, 42, 43, 44. The polarization orientations of signal beams at the respective output order number end are shown as in FIG. 7. For a 4×4 optical matrix switching device, four signal beams from the four input fibers shall be transmitted into the same output port, and have to be coupled into the same one output fiber, i.e., 11, 21, 31, 41—1'; 12, 22, 32, 42—2'; 13, 23, 33, 43—3'; 14, 24, 34, 44 4'. The optical matrix-switching device serving for an all-optical cross connection system must be a non-block system of the destination addresses. Although signals at each input port are possible to be transmitted to any output port, one output port is connected only with one input port within the identical period. The present invention provides a method for routing combining parallel optical channels in need of reaching to the same output port into the identical parallel optical channel, so that signal light beams from any input port can be coupled high-effectively to any output port.

Figure 9:
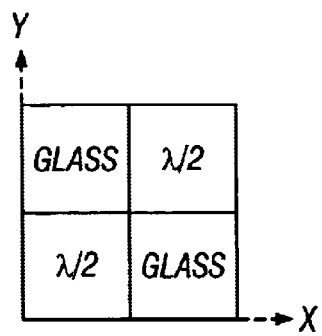
FIG. 9 is a schematic diagram showing a λ/2 wavelength plate array.
Figure 10:
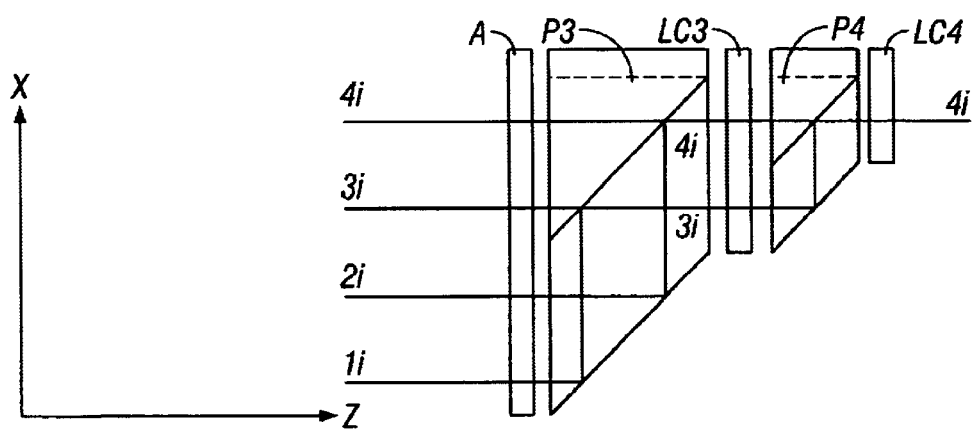
FIG. 10 is a schematic diagram showing a routing combination unit of parallel optical channel of using a trapezoid polarization prism as a crystal prism.

As shown in FIG. 10, for a 4×4 bidirection optical matrix switching system, a routing combination unit of parallel optical channels is structured with two trapezoid polarization prisms $P_3$, $P_4$ and two optical switching arrays LC3, LC4. The orientation of the trapezoid polarization prism is located in the x direction, and is made an angle of 90° to trapezoid polarization prisms of routing parallel optical channel system shown in FIG. 6. As a result, the polarization orientation of optical channels in routing combination unit of parallel optical channels in FIG. 10 is at an angle of 90° to that in routing is parallel optical channel system shown in FIG. 6. In FIG. 10, the input optical channels $1i$, $2i$, $3i$ and $4i$ indicate four parallel optical channels shown in FIG. 7(f), respectively, which are $1i$—11, 12, 13, 14; $2i$—21, 22, 23, 24; $3i$—31, 32, 33, 34; $4i$—41, 42, 43, 44. The polarization orientation of each signal beam in routing combination procedure is illustrated in FIG. 11. In FIG. 7(f), the polarization orientations of signal beams in the 4×4 parallel optical channels are the same as that shown in FIG. 11(a). However, in FIGS. 11(c)–(h), the polarized orientation of o-beam is similar to that of e-beam in FIG. 11(a), and the polarized orientation of e-beam is similar to that of o-beam in FIG. 11(a) Having passed the λ/2 wavelength plate array in FIG. 9, the polarization orientations of signal beams in the 4×4 parallel optical channel are shown as in FIG. 11(c). Having passed the trapezoid polarization prism $P_3$, each two of parallel optical channels are combined into one parallel optical channel, $1i+3i$—$3i$ and $2i+4i$—4I. Thus, the 4×4 parallel optical channel is transformed into a 4×2 parallel optical channel, in which the polarization orientations of signal beams are shown in FIG. 11(d), and are described with a matrix formula as follow $$\begin{bmatrix} A^o_{14} + A^e_{34} & A^o_{24} + A^e_{44} \\ A^o_{13} + A^e_{33} & A^o_{23} + A^e_{43} \\ A^o_{12} + A^e_{32} & A^o_{22} + A^e_{42} \\ A^o_{11} + A^e_{31} & A^o_{21} + A^e_{41} \end{bmatrix}$$

Each two of them are combined into one parallel optical channel, that means, the signal beams in two optical channels can simultaneously be passes through the identical cell of optical switching array LC3, $A^o_{11}+A^e_{31}-M^{(3)}_{31}$, $A^o_{21}+A^e_{41}-M^{(33)}_{31}$, $A^o_{12}+A^e_{32}-M^{(3)}_{32}$, $A^o_{22}+A^e_{42}-M_{42(3)}$, $A^o_{13}+A^e_{33e}-M^{(3)}_{33}$, $A^o_{23}+A^e_{43}-M^{(3)}_{43}$, $A^o_{14}+A^e_{34}-M^{(3)}_{34}$, and $A^o_{24}+A^{44e}-M^{(3)}_{44}$. In FIG. 10, with trapezoid polarization prism $P_4$, four parallel optical channels are combined into one parallel optical channel, i.e., $1i+2i+3i+4i$—$4i$. However, under the control of optical switching LC3, only if the polarization orientations of the signal beams in the four parallel optical channels meet the condition hereinafter, the signal beams can be combined into one parallel optical channel $4i$ to transmit. The mathematics equation are described as $$\begin{bmatrix} M^{(3)}_{14}(A^o_{14} + A^e_{34}) & M^{(3)}_{44}(A^o_{24} + A^e_{44}) \\ M^{(3)}_{33}(A^o_{13} + A^e_{33}) & M^{(3)}_{43}(A^o_{23} + A^e_{43}) \\ M^{(3)}_{32}(A^o_{12} + A^e_{32}) & M^{(3)}_{42}(A^o_{22} + A^e_{42}) \\ M^{(3)}_{31}(A^o_{11} + A^e_{31}) & M^{(3)}_{41}(A^o_{21} + A^e_{41}) \end{bmatrix} = \begin{bmatrix} A^o_{14} + A^o_{34} & A^e_{24} + A^e_{44} \\ A^o_{13} + A^o_{33} & A^e_{23} + A^e_{43} \\ A^o_{12} + A^o_{32} & A^e_{22} + A^e_{42} \\ A^o_{11} + A^o_{31} & A^e_{21} + A^e_{41} \end{bmatrix} \quad (3)$$

Having passed through trapezoid polarization prism $P_4$, signal beams in 4×2 parallel optical channel, meeting the above-mentioned polarization condition, are transformed to 4×1 parallel optical channel. The polarization orientations of the signal beams in 4×1 parallel optical channel are illustrated in FIG. 11(h), and expressed as $$\begin{bmatrix} A^o_{14} + A^o_{34} + A^e_{24} + A^e_{44} \\ A^o_{13} + A^o_{33} + A^e_{23} + A^e_{43} \\ A^o_{12} + A^o_{32} + A^e_{22} + A^e_{42} \\ A^o_{11} + A^o_{31} + A^e_{21} + A^e_{41} \end{bmatrix}$$

For an unidirection matrix switching shown in FIGS. 2a(A) and 2a(B), cell states in various stages of optical switching, corresponding to each signal at input ends routes to any output port, are determined by equations (1), (2) and (3). For a bidirection matrix switching shown in FIGS. 2(A) and 2(B), the linear polarization signal beams have to revert to original random polarization signal beams. Therefore, the unit V in FIG. 2(B) is still the crystal unit shown in FIG. 4, but the order of arranging the crystals and the wavelength plates in FIG. 2(B) is mirror-symmetry to that in FIG. 2(A). Consequently, only if signal beams into the crystal unit are totally linear polarization e-beam, they can be reverted to original random polarization signal beams via the crystal unit. Thus, under the control of corresponding cell in optical switching, only if the polarization orientations of four signal beams in one parallel optical channel meet mathematics equation hereinafter, these beams can be coupled into output fibers.

$$\begin{bmatrix} M^{(4)}_{44}(A^o_{14} + A^e_{24} + A^o_{34} + A^e_{44}) \\ M^{(4)}_{43}(A^o_{13} + A^e_{23} + A^o_{33} + A^e_{43}) \\ M^{(4)}_{42}(A^o_{12} + A^e_{22} + A^o_{32} + A^e_{42}) \\ M^{(4)}_{41}(A^o_{11} + A^e_{21} + A^o_{31} + A^e_{41}) \end{bmatrix} = \begin{bmatrix} A^e_{14} + A^e_{24} + A^o_{34} + A^o_{44} \\ A^e_{13} + A^e_{23} + A^o_{33} + A^o_{43} \\ A^e_{12} + A^e_{22} + A^o_{32} + A^o_{42} \\ A^e_{11} + A^e_{21} + A^o_{31} + A^o_{41} \end{bmatrix} \quad (4)$$

The above method, in which parallel optical channels are routing combined into one parallel optical channel, is applicable to a $2^m \times 2^n$ optical matrix switching system. A 2×2 optical matrix switching needs one set of trapezoid lo polarization prism and optical switching array pair. A 4×4 system needs two sets of trapezoid polarization prism and optical switching array pair. A 2×8 system needs one set of trapezoid polarization prism and optical switching array pair. A $2^m \times 2^n$ system needs m sets of trapezoid polarization prism and optical switching array pair. However, the last stage of optical switching array for one-direction matrix switching can be omitted. The optical switching array device is identical to the optical switching array in routing parallel optical channel system, and may be an optical switching of movable wavelength plate array as well as a liquid-crystal optical switching array device (including a Ferro-liquid crystal optical switching array device).

A routing combination unit of parallel optical channel is also structured with birefringence crystal prisms. A birefringence crystal prism can use trapezoid prism crystals shown in FIG. 12(A) or rectangle parallel plane crystals shown in FIG. 12(B). A 4×4 routing combination unit of parallel optical channel of using a birefringence crystal prism is structured with two sets of birefringence crystal prisms and optical switching arrays. In this system, two birefringence crystal prisms $C_3$ and $C_4$ will replace two trapezoid polarization prisms $P_2$ and $P_4$ shown in FIG. 10, respectively.

Figure 12A:
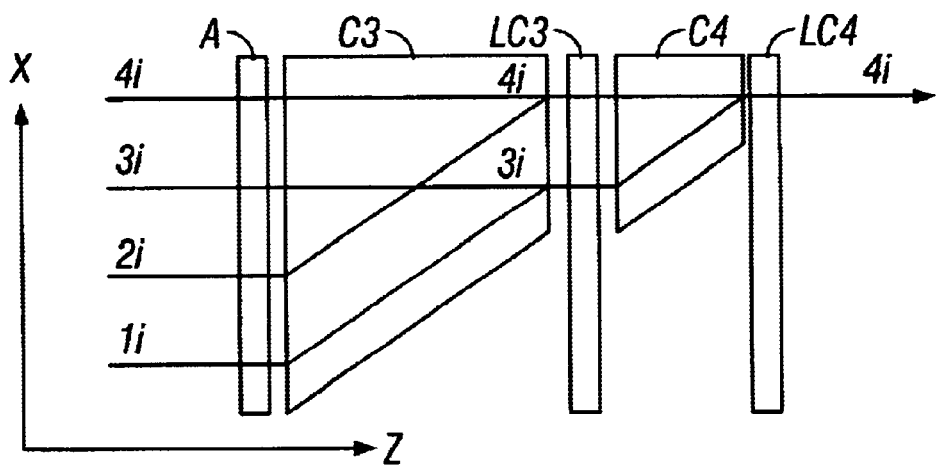
FIGS. 12(A) and 12(B) are schematic diagram showing a routing combination unit of parallel optical channel using a birefringence crystal prism as a crystal prism.
Figure 12B:
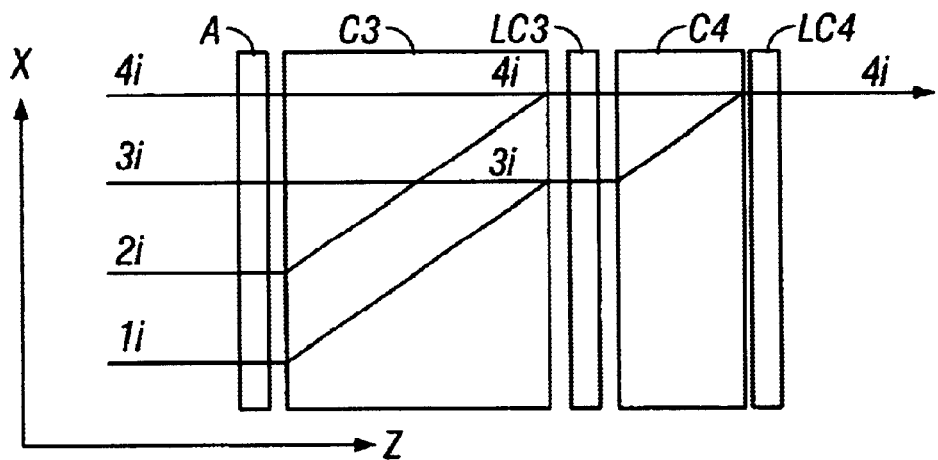

Selection of the thickness and cut-orientation of birefringence crystals $C_3$, $C_4$ make the crystals to have properties shown as in FIGS. 12(A) and 12(B). In a crystal $C_3$, o-polarization beams 4$i$ and 3$i$ pass through the crystal in straight line, and e-polarization beams 2$i$ and 1$i$ vertically come into the crystal and propagate in upward-deflection direction. Thus, on the output end surface of the crystal $C_3$, beams 2$i$ and 4$i$ are completely combined into one parallel optical channel 4$i$, and beams 1$i$ and 3$i$ are completely combined into one parallel optical channel 3$i$. In a crystal $C_4$, o-polarization beam 4$i$ passes through the crystal in straight line, but e-polarization beam 4$i$ vertically come into the crystal and propagates in upward-deflection direction. Thus, on the output port surface of the crystal C4, beams 3$i$ and 4$i$ are completely combined into one parallel optical channel 4$i$.

For the routing combination unit of parallel optical channel unit with birefringence crystals, the principle of routing-combination and control system is totally similar to that for routing combination unit of parallel optical channel with trapezoid polarization prisms. However, for two units with different prisms above-mentioned, the respective signal beams in the parallel optical channels takes totally the opposite polarization orientation. Consequently, in the routing combination unit with birefringence crystals, the mathematics equations of the routing combination procedure of parallel optical channels are expressed as (3c) and (4d) hereinafter. The routing combination procedure of 4×4 parallel optical channels is applicable to a $2^m \times 2^n$ optical matrix switching system with birefringence crystals.

$$\begin{bmatrix} M_{34}^{(3)}(A_{14}^e + A_{34}^0), & M_{44}^{(3)}(A_{24}^e + A_{44}^0) \\ M_{33}^{(3)}(A_{13}^e + A_{33}^0), & M_{43}^{(3)}(A_{23}^e + A_{43}^0) \\ M_{32}^{(3)}(A_{12}^e + A_{32}^0), & M_{42}^{(3)}(A_{22}^e + A_{42}^0) \\ M_{31}^{(3)}(A_{11}^e + A_{31}^0), & M_{41}^{(3)}(A_{21}^e + A_{41}^0) \end{bmatrix} = \begin{bmatrix} A_{14}^e + A_{34}^e, & A_{24}^0 + A_{44}^0 \\ A_{13}^e + A_{33}^e, & A_{23}^0 + A_{43}^0 \\ A_{12}^e + A_{32}^e, & A_{22}^0 + A_{42}^0 \\ A_{11}^e + A_{31}^e, & A_{21}^0 + A_{41}^0 \end{bmatrix} \quad (3c)$$

$$\begin{bmatrix} M_{44}^{(4)}(A_{14}^e + A_{24}^0 + A_{34}^e + A_{44}^0) \\ M_{43}^{(4)}(A_{13}^e + A_{23}^0 + A_{33}^e + A_{43}^0) \\ M_{42}^{(4)}(A_{12}^e + A_{22}^0 + A_{32}^e + A_{42}^0) \\ M_{41}^{(4)}(A_{11}^e + A_{21}^0 + A_{31}^e + A_{41}^0) \end{bmatrix} = \begin{bmatrix} A_{14}^e + A_{24}^e + A_{34}^e + A_{44}^e \\ A_{13}^e + A_{23}^e + A_{33}^e + A_{43}^e \\ A_{12}^e + A_{22}^e + A_{32}^e + A_{42}^e \\ A_{11}^e + A_{21}^e + A_{31}^e + A_{41}^e \end{bmatrix} \quad (4d)$$

Optical elements in optical matrix switching device according to the present invention are designed specifically as follow:

1. Design of Trapezoid Polarization Prisms $P_1$, $P_2$, $P_3$, $P_4$.

Figure 13C:
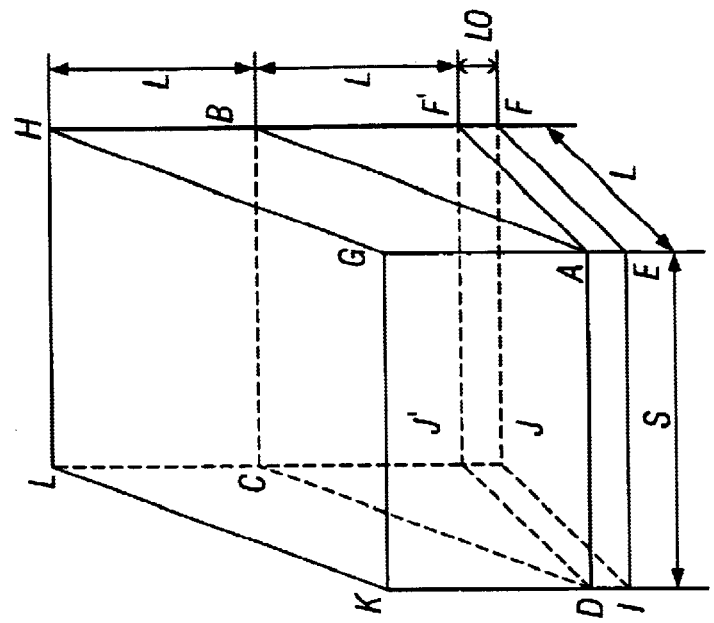
FIG. 13 illustrates a design scheme of a trapezoid polarization prism.
Figure 13B:
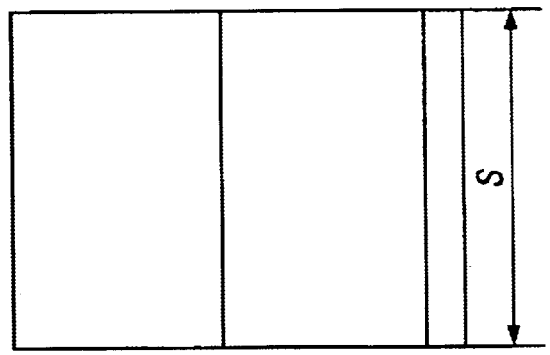
Figure 13A:
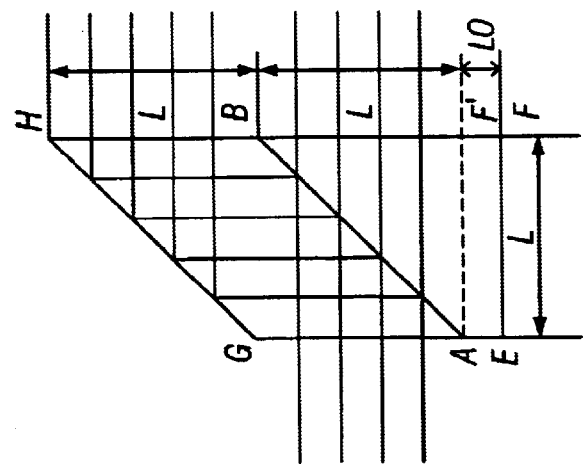

Designs of trapezoid polarization prisms $P_1$, $P_2$, $P_3$, $P_4$ in the above-mentioned figures are shown in FIG. 13. The prisms are combined with parallelogram prism ABHG and corner cubic prism AF'B or corner cubic trapezoid prism EFBA, shown in FIG. 13($a$). FIG. 13($c$) is a three-dimensional scheme view of prisms shown in FIG. 13($a$). ABCD is a polarization film, of which the bandwidth is larger than wavelength range of signal beams transmitted. In FIG. 13($a$), $\angle GHB = \angle GAB = \angle ABF' = \angle BAF' = 45°$, $AG=HB=BF'=AF'$. The space between input fibers is $d_0$. For the polarization prism $P_1$ in FIG. 6 and the trapezoid polarization prism $P_4$ in FIG. 10, when only one-dimension M×1 parallel optical channel passes through their light-passing planes AGKD, J'F'BC, and BHLC, height of the parallelogram prism is $AG=BH=d_0$. In the corner cubic trapezoid prism EFBA, being $AF'=F'B=EF=d_0$ and $AE=F'F=L_0$, height $L_0$ depends on requirement of system design. For the trapezoid polarization prisms $P_2$ in FIG. 6 and $P_3$ in FIG. 10, when two-dimension M×2 parallel optical channel pass through their light-passing planes AGCD, J'F'BC, and BHLC, height of the prism is $AG=BH=2d_0$, $AF'=FB=EF=2d_0$. For M×N (M=$2^m$, N=$2^n$, m,n=0, 1,2 ...) matrix optical switching system, the parallel optical channels of M×$2^i$ (i=0,1,2, ... n−1) or $2^j$×N (j=0,1, ... m−1) must pass through the light-passing planes AGKD, BHLC and J'F'BC, heights of the parallelogram prism and the corner cubic prism are $AG=BH=F'B=AF'=EF=2^i d_0$ (i=0,1,2, ... n−1) or $2^j d_0$ (j=m−1 ... 1,0). The width S of the prism depends on the number of the input, the output fibers and the spacing $d_0$ between fibers in FIG. 1. The width S of the prism is regularly $M \times d_0 + S_0$, $N \times d_0 + S_0$, where $S_0$ is dependent on requirement of system design.

2. Design of Trapezoid Prism Crystals $C_1$, $C_2$, $C_3$, $C_4$.

Figure 14C:
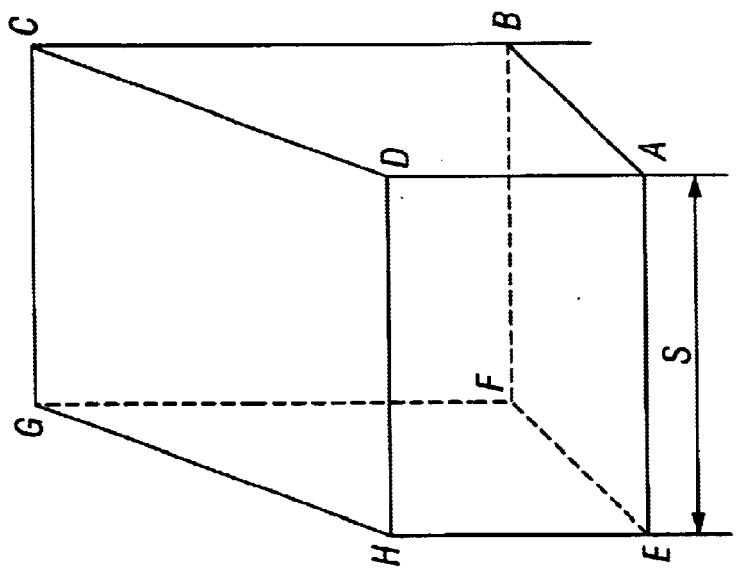
FIG. 14 illustrates a design scheme of a trapezoid prism crystal.
Figure 14B:
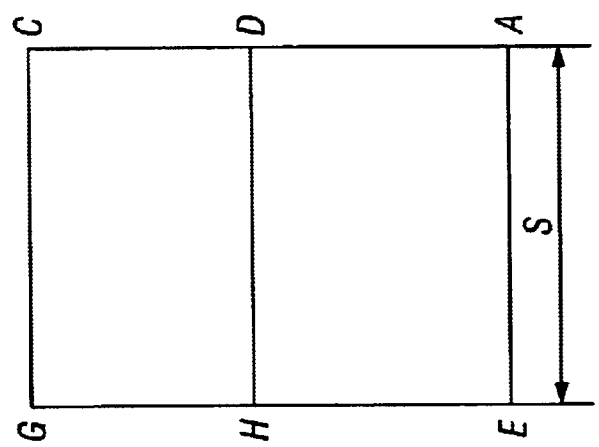
Figure 14A:
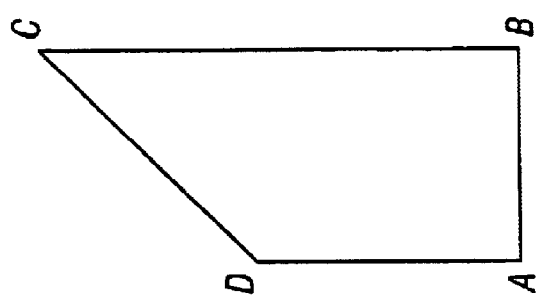

Designs of trapezoid prism crystals $C_1$, $C_2$, $C_3$, $C_4$ are shown in FIG. 14. There is $\angle DCB = \angle HGF = 45°$. The width S of the prism depends on the number M of input fibers and the spacing $d_0$ between fibers in FIGS. 8(A), 8(B), 12(A) and 12(B). The width S of the prism is regularly $M \times d_0 + S_0$, where $S_0$ is dependent on requirement of system design. The height of birefringence crystals is dependent on the input light beam array. For M×N (M=$2^m$, N=$2^n$, m,n=0,1,2, ... ) matrix optical switching system, the parallel optical channels of M×$2^i$ (i=0,1,2, ... n−1) or $2^j$×N (j=0,1, ... m−1) must pass through the light-passing plane ADHE, the height of the prism is $AD=HE=2^i d_0$ (i=0,1,2, ... n−1) or $2^j d_0$ (j=m−1 ... 1, 0,) The parallel optical channels of M×2·$2^i$ (i=0,1,2, ... n−1) or 2·$2^j$×N (j=m−1 ... 1, 0,) must pass through the light-passing plane BCGF, the height of the prism is $BC=FG=2 \cdot 2^i d_0$ (i=0,1,2, ... n−1), or $2 \cdot 2^j d_0$ (j=m−1 ... 1, 0,). Select the thickness and cut-orientation of birefringence crystals $C_1$ shown as in FIGS. 8(A) and 8(B) and $C_4$ shown as in FIGS. 12(A) and 12(B), and make the crystals have the properties hereinafter. In crystals $C_1$ and $C_4$, if the incident beam i is an o-polarization beam, it will be transmitted in straight line. When the incident light beam i is an e-polarization beam, it propagates through the crystals in upward- (or downward-) deflection direction, and is deflected with spacing $d_0$ upwards apart from the o-beam on the output port surface of the crystal $C_1$, and then parallel optical channel transmission are established. Select the thickness and cut-orientation of birefringence crystals $C_2$ shown as in FIGS. 8(A) and 8(B) and $C_3$ shown as in FIGS. 12(A) and 12(B), and make the crystals have the properties hereinafter. The thickness of the crystals $C_2$ and $C_3$ is twice that of crystals $C_1$, and $C_4$, two parallel optical channels are split into four parallel optical channels. When the incident light beam i is an o-polarization beam, it will pass through the crystals $C_2$ and $C_3$ in straight line. When the beam i is an e-polarization beam, it propagates through the crystals in upward- (or downward-) deflection direction, and is deflected with spacing $2d_0$ apart from the o-beam on the output port surface of $C_2$ and $C_3$ upwards, and then propagates in the parallel Direction.

3. Configuration of Optical Switching Device With Movable Wavelength Plate Array Optical switching device with movable wavelength plate array is configured with N glass base plates of which the width is slightly smaller than $d_0$. $\lambda/2$ or $\lambda/4$ wavelength plates are attached on the different light-passing areas with spacing $d_0$ on each base plate. Under the control of external electric signal commands, each glass base plate can be rapidly translated between two states corresponding to behaviors of glass medium and $\lambda/2$ wavelength plate, or three states corresponding to natures of regular glass medium, $\lambda/2$ wavelength plate and $\lambda/4$ wavelength plate. FIG. 15 illustrates one of the above-mentioned structures, in which (a) is the configuration of optical switching devices LC1 and LC4 with movable wavelength plate array, (b) is the configuration of optical switching devices LC2 and LC3 with movable wavelength plate array, and (c) is the configuration of optical switching devices LC3 and LC4 with movable wavelength plate array. Optical switching device can be a liquid-crystal optical switching array (including Ferro-liquid-crystal optical switching array with 50 $\mu s$ switching rate, in which each cell can be transformed between two or three states above-mentioned rapidly.

Finally, the routing control in the routing matrix switching method is explained as follow.

1. The Routing Control for the Routing Matrix Switching Device With Trapezoid Polarization Prisms In the bidirection 4×4 routing matrix switching device, the routing procedure of transmitting signal beams from each input port to any output port is dependent on the states of optical switching cells in four switching array devices. Each optical switching cell state is dependent on four matrix equations described as follow:

$$\begin{bmatrix} M_{11}^{(1)}A_{11}^e & M_{21}^{(1)}A_{21}^e M_{31}^{(1)}A_{31}^e & M_{41}^{(1)}A_{41}^e \\ M_{11}^{(1)}A_{11}^e & M_{21}^{(1)}A_{21}^e M_{31}^{(1)}A_{31}^e & M_{41}^{(1)}A_{41}^e \end{bmatrix} = \begin{bmatrix} A_{21}^o & A_{22}^o & A_{32}^o & A_{42}^o \\ A_{11}^e & A_{21}^e & A_{31}^e & A_{41}^e \end{bmatrix} \quad (1)$$

$$\begin{bmatrix} M_{12}^{(2)}A_{12}^o, & M_{22}^{(2)}A_{22}^o & M_{32}^{(2)}A_{32}^o & M_{42}^{(2)}A_{42}^o \\ M_{11}^{(2)}A_{11}^e, & M_{21}^{(2)}A_{21}^e & M_{31}^{(2)}A_{31}^e & M_{41}^{(2)}A_{41}^e \\ M_{12}^{(2)}A_{12}^o, & M_{22}^{(2)}A_{22}^o & M_{32}^{(2)}A_{32}^o & M_{42}^{(2)}A_{42}^o \\ M_{11}^{(2)}A_{11}^e, & M_{21}^{(2)}A_{21}^e & M_{31}^{(2)}A_{32}^e & M_{41}^{(2)}A_{41}^e \end{bmatrix} = \begin{bmatrix} A_{14}^o & A_{24}^o & A_{34}^o & A_{44}^o \\ A_{13}^e & A_{23}^e & A_{33}^e & A_{43}^e \\ A_{12}^e & A_{22}^e & A_{32}^e & A_{42}^e \\ A_{11}^e & A_{21}^e & A_{31}^e & A_{41}^e \end{bmatrix} \quad (2)$$

$$\begin{bmatrix} M_{34}^{(3)}(A_{14}^o + A_{34}^e) & M_{44}^{(3)}(A_{24}^o + A_{44}^e) \\ M_{33}^{(3)}(A_{13}^o + A_{33}^e) & M_{43}^{(3)}(A_{23}^o + A_{43}^e) \\ M_{32}^{(3)}(A_{12}^e + A_{32}^e) & M_{42}^{(3)}(A_{22}^o + A_{42}^e) \\ M_{31}^{(3)}(A_{11}^o + A_{31}^e) & M_{41}^{(3)}(A_{21}^o + A_{41}^e) \end{bmatrix} = \begin{bmatrix} A_{14}^o + A_{34}^e & A_{24}^e + A_{44}^e \\ A_{13}^o + A_{33}^e & A_{23}^e + A_{43}^e \\ A_{12}^e + A_{32}^e & A_{22}^e + A_{42}^e \\ A_{11}^o + A_{31}^e & A_{21}^e + A_{41}^e \end{bmatrix} \quad (3)$$

$$\begin{bmatrix} M_{44}^{(4)}(A_{14}^o + A_{24}^e + A_{34}^o + A_{44}^e) \\ M_{43}^{(4)}(A_{13}^o + A_{23}^e + A_{33}^o + A_{43}^e) \\ M_{42}^{(4)}(A_{12}^o + A_{22}^e + A_{32}^o + A_{42}^e) \\ M_{41}^{(4)}(A_{11}^o + A_{21}^e + A_{31}^o + A_{41}^e) \end{bmatrix} = \begin{bmatrix} A_{14}^e + A_{24}^e + A_{34}^e + A_{44}^e \\ A_{13}^e + A_{23}^e + A_{33}^e + A_{43}^e \\ A_{12}^e + A_{22}^e + A_{32}^e + A_{42}^e \\ A_{11}^e + A_{21}^e + A_{31}^e + A_{41}^e \end{bmatrix} \quad (4)$$

With four equations above-mentioned, under the external voltage control command, the state $M_i^j$ of each optical switching cell in the routing procedure of transmitting signal beams from each input port to any output port is obtained. When signal beams from the first input port are transmitted to any output end, under the control of the external voltage, the state $M_i^j$ of respective optical switching cell in four optical switching devices is When signal beams from the second input port are transmitted to any output end, under the control of the external voltage, the state $M_i^j$ of respective optical switching cell in four optical switching devices is $A_1 \to B_1: M_{11}^{(1)} A_{11}^e \to A_{11}^e \oplus M_{11}^{(2)} A_{11}^e \to A_{11}^e \oplus M_{31}^{(3)}$
$A_{11}^o \to A_{11}^o \oplus M_{41}^{(4)} A_{11}^o \to A_{11}^e$ $A_1 \to B_2: M_{11}^{(1)} A_{11}^e \to A_{12}^e \oplus M_{12}^{(2)} A_{12}^o \to A_{11}^e \oplus M_{32}^{(3)}$
$A_{12}^o \to A_{12}^o \oplus M_{42}^{(4)} A_{21}^o \to A_{12}^e$ $A_1 \to B_3: M_{11}^{(1)} A_{11}^e \to A_{11}^e \oplus M_{11}^{(2)} A_{11}^o \to A_{13}^e \oplus M_{33}^{(3)}$
$A_{13}^o \to A_{13}^o \oplus M_{43}^{(4)} A_{13}^o \to A_{13}^e$ $A_1 \to B_4: M_{11}^{(1)} A_{11}^e \to A_{12}^e \oplus M_{12}^{(2)} A_{12}^o \to A_{14}^e \oplus M_{34}^{(3)}$
$A_{14}^o \to A_{14}^o \oplus M_{44}^{(4)} A_{14}^o \to A_{14}^e$ When signal beams from the third input port are transmitted to any output port, under the control of the external voltage, the state $M^j$ of respective optical switching cell in four optical switching devices is $A_2 \to B_1: M_{21}^{(1)} A_{21}^e \to A_{21}^e \oplus M_{21}^{(2)} A_{21}^e \to A_{21}^e \oplus M_{41}^{(3)}$
$A_{21}^o \to A_{21}^e \oplus M_{41}^{(4)} A_{21}^o \to A_{21}^e$ $A_2 \to B_2: M_{21}^{(1)} A_{21}^e \to A_{22}^e \oplus M_{12}^{(2)} A_{22}^o \to A_{22}^e \oplus M_{42}^{(3)}$
$A_{22}^o \to A_{22}^e \oplus M_{42}^{(4)} A_{22}^o \to A_{22}^e$ $A_2 \to B_3: M_{21}^{(1)} A_{21}^e \to A_{21}^e \oplus M_{21}^{(2)} A_{21}^e \to A_{23}^o \oplus M_{43}^{(3)}$
$A_{23}^o \to A_{23}^e \oplus M_{43}^{(4)} A_{23}^e \to A_{23}^e$ $A_2 \to B_4: M_{21}^{(1)} A_{21}^e \to A_{22}^e \oplus M_{22}^{(2)} A_{22}^o \to A_{24}^o \oplus M_{44}^{(3)}$
$A_{24}^o \to A_{24}^e \oplus M_{44}^{(4)} A_{24}^e \to A_{24}^e$ When signal beams from the third input port are transmitted to any output port, under the control of the external voltage, the state $M_i^j$ of respective optical switching cell in four optical switching devices is $A_3 \to B_1: M_{31}^{(1)} A_{31}^e \to A_{31}^e \oplus M_{31}^{(2)} A_{31}^e \to A_{31}^e \oplus M_{31}^{(3)}$
$A_{31}^e \to A_{21}^o \oplus M_{41}^{(4)} A_{31}^o \to A_{31}^e$ $A_3 \to B_2: M_{31}^{(1)} A_{31}^e \to A_{32}^e \oplus M_{32}^{(2)} A_{32}^o \to A_{32}^e \oplus M_{32}^{(3)}$
$A_{32}^e \to A_{32}^o \oplus M_{42}^{(4)} A_{32}^o \to A_{32}^e$ $A_3 \to B_3: M_{31}^{(1)} A_{31}^e \to A_{31}^e \oplus M_{31}^{(2)} A_{31}^e \to A_{33}^o \oplus M_{33}^{(3)}$
$A_{33}^o \to A_{33}^o \oplus M_{43}^{(4)} A_{33}^e \to A_{33}^e$ $A_3 \to B_4: M_{31}^{(1)} A_{31}^e \to A_{32}^e \oplus M_{32}^{(2)} A_{32}^o \to A_{34}^o \oplus M_{34}^{(3)}$
$A_{34}^e \to A_{34}^o \oplus M_{44}^{(4)} A_{34}^o \to A_{34}^e$ When signal beams from the fourth input port are transmitted to any output port, under the control of the external voltage, the state $M_i^j$ of respective optical switching cell in four optical switching devices is $A_4 \to B_1: M_{41}^{(1)} A_{41}^e \to A_{41}^e \oplus M_{41}^{(2)} A_{41}^e \to A_{41}^e \oplus M_{41}^{(3)}$
$A_{41}^o \to A_{41}^e \oplus M_{41}^{(4)} A_{41}^o \to A_{41}^e$ $A_4 \to B_2: M_{41}^{(1)} A_{41}^e \to A_{42}^e \oplus M_{42}^{(2)} A_{42}^o \to A_{42}^e \oplus M_{42}^{(3)}$
$A_{42}^o \to A_{42}^e \oplus M_{42}^{(4)} A_{42}^o \to A_{42}^e$ $A_4 \to B_3: M_{41}^{(1)} A_{41}^e \to A_{41}^e \oplus M_{41}^{(2)} A_{41}^e \to A_{43}^o \oplus M_{43}^{(3)}$
$A_{43}^o \to A_{43}^e \oplus M_{43}^{(4)} A_{43}^e \to A_{43}^e$ $A_4 \to B_4: M_{41}^{(1)} A_{41}^e \to A_{42}^e \oplus M_{42}^{(2)} A_{42}^o \to A_{44}^o \oplus M_{44}^{(3)}$
$A_{44}^e \to A_{44}^o \oplus M_{44}^{(4)} A_{44}^o \to A_{44}^e$ 2. The Routing Control for the Bidirection Routing Matrix Switching Device With Birefringence Crystals In 4×4 birefringence crystal routing matrix switching device, the routing procedure of transmitting signal beams from each input port to any output port is dependent on the states of optical switching cells in four switching array devices. Each optical switching cell state is dependent from four matrix equations described as follow:

$$\begin{bmatrix} M_{11}^{(1)}A_{11}^e & M_{21}^{(1)}A_{21}^e M_{31}^{(1)}A_{31}^e & M_{41}^{(1)}A_{41}^e \\ M_{11}^{(1)}A_{11}^e & M_{21}^{(1)}A_{21}^e M_{31}^{(1)}A_{31}^e & M_{41}^{(1)}A_{41}^e \end{bmatrix} = \begin{bmatrix} A_{12}^e & A_{22}^e & A_{32}^e & A_{42}^e \\ A_{11}^o & A_{21}^o & A_{31}^o & A_{41}^o \end{bmatrix} \quad (1a)$$

$$\begin{bmatrix} M_{12}^{(2)}A_{12}^e, & M_{22}^{(2)}A_{22}^e & M_{32}^{(2)}A_{32}^e & M_{42}^{(2)}A_{42}^e \\ M_{11}^{(2)}A_{11}^o, & M_{21}^{(2)}A_{21}^o & M_{31}^{(2)}A_{31}^o & M_{41}^{(2)}A_{41}^o \\ M_{12}^{(2)}A_{12}^e, & M_{22}^{(2)}A_{22}^e & M_{32}^{(2)}A_{32}^e & M_{42}^{(2)}A_{42}^e \\ M_{11}^{(2)}A_{11}^o, & M_{21}^{(2)}A_{21}^o & M_{31}^{(2)}A_{32}^o & M_{41}^{(2)}A_{41}^o \end{bmatrix} = \begin{bmatrix} A_{14}^e & A_{24}^e & A_{34}^e & A_{44}^e \\ A_{13}^e & A_{23}^e & A_{33}^e & A_{43}^e \\ A_{12}^o & A_{22}^o & A_{32}^o & A_{42}^o \\ A_{11}^o & A_{21}^o & A_{31}^o & A_{41}^o \end{bmatrix} \quad (2b)$$

$$\begin{bmatrix} M_{34}^{(3)}(A_{14}^e + A_{34}^o) & M_{44}^{(3)}(A_{24}^e + A_{44}^o) \\ M_{33}^{(3)}(A_{13}^e + A_{33}^o) & M_{43}^{(3)}(A_{23}^e + A_{43}^o) \\ M_{32}^{(3)}(A_{12}^e + A_{32}^o) & M_{42}^{(3)}(A_{22}^e + A_{42}^o) \\ M_{31}^{(3)}(A_{11}^e + A_{31}^o) & M_{41}^{(3)}(A_{21}^e + A_{41}^o) \end{bmatrix} = \begin{bmatrix} A_{14}^e + A_{34}^o & A_{24}^o + A_{44}^o \\ A_{13}^e + A_{33}^o & A_{23}^o + A_{43}^o \\ A_{12}^e + A_{32}^o & A_{22}^o + A_{42}^o \\ A_{11}^e + A_{31}^o & A_{21}^o + A_{41}^o \end{bmatrix} \quad (3c)$$

-continued $$\begin{bmatrix} M_{44}^{(4)}(A_{14}^e + A_{24}^o + A_{34}^e + A_{44}^o) \\ M_{43}^{(4)}(A_{13}^e + A_{23}^o + A_{33}^e + A_{43}^o) \\ M_{42}^{(4)}(A_{12}^e + A_{22}^o + A_{32}^e + A_{42}^o) \\ M_{41}^{(4)}(A_{11}^e + A_{21}^o + A_{31}^e + A_{41}^o) \end{bmatrix} = \begin{bmatrix} A_{14}^e + A_{24}^e + A_{34}^e + A_{44}^e \\ A_{13}^e + A_{23}^e + A_{33}^e + A_{43}^e \\ A_{12}^e + A_{22}^e + A_{32}^e + A_{42}^e \\ A_{11}^e + A_{21}^e + A_{31}^e + A_{41}^e \end{bmatrix} \quad (4d)$$

With above four equations for birefringence crystal bidirection routing matrix switching device, under the external voltage control command, the state $M_i^j$ of each optical switching cell in the routing procedure of transmitting signal beams from each input port to any output port is obtained. When signal beams from the first input port are transmitted to any output port, under the control of the external voltage, the state $M_i^j$ of respective optical switching cell in four optical switching devices is $A_1 \rightarrow B_1: M_{11}^{(1)} A_{11}^e \rightarrow A_{11}^o \oplus M_{11}^{(2)} A_{11}^o \rightarrow A_{11}^o \oplus M_{31}^{(3)}$
$A_{11}^e \rightarrow A_{11}^e \oplus M_{41}^{(4)} A_{11}^e \rightarrow A_{11}^e$ $A_1 \rightarrow B_2: M_{11}^{(1)} A_{11}^e \rightarrow A_{12}^o \oplus M_{12}^{(2)} A_{12}^o \rightarrow A_{12}^o \oplus M_{32}^{(3)}$
$A_{12}^e \rightarrow A_{12}^e \oplus M_{42}^{(4)} A_{12}^e \rightarrow A_{12}^e$ $A_1 \rightarrow B_3: M_{11}^{(1)} A_{11}^e \rightarrow A_{11}^o \oplus M_{11}^{(2)} A_{11}^o \rightarrow A_{13}^o \oplus M_{33}^{(3)}$
$A_{13}^e \rightarrow A_{13}^e \oplus M_{43}^{(4)} A_{13}^e \rightarrow A_{13}^e$ $A_1 \rightarrow B_4: M_{11}^{(1)} A_{11}^e \rightarrow A_{12}^e \oplus M_{12}^{(2)} A_{12}^e \rightarrow A_{14}^e \oplus M_{34}^{(3)}$
$A_{14}^e \rightarrow A_{14}^e \oplus M_{44}^{(4)} A_{14}^e \rightarrow A_{14}^e$ When signal beams from the second input port are transmitted to any output port, under the control of the external voltage, the state $M_i^j$ of respective optical switching cell in four optical switching devices is $A_2 \rightarrow B_1: M_{21}^{(1)} A_{21}^e \rightarrow A_{21}^o \oplus M_{21}^{(2)} A_{21}^o \rightarrow A_{21}^o \oplus M_{41}^{(3)}$
$A_{21}^e \rightarrow A_{21}^o \oplus M_{41}^{(4)} A_{21}^o \rightarrow A_{21}^e$ $A_2 \rightarrow B_2: M_{21}^{(1)} A_{21}^e \rightarrow A_{22}^e \oplus M_{22}^{(2)} A_{22}^o \rightarrow A_{22}^o \oplus M_{42}^{(3)}$
$A_{22}^e \rightarrow A_{22}^o \oplus M_{42}^{(4)} A_{22}^o \rightarrow A_{22}^e$ $A_2 \rightarrow B_3: M_{21}^{(1)} A_{21}^e \rightarrow A_{21}^o \oplus M_{21}^{(2)} A_{21}^o \rightarrow A_{23}^e \oplus M_{43}^{(3)}$
$A_{23}^e \rightarrow A_{23}^o \oplus M_{43}^{(4)} A_{23}^o \rightarrow A_{23}^e$ $A_2 \rightarrow B_4: M_{21}^{(1)} A_{21}^e \rightarrow A_{22}^e \oplus M_{22}^{(2)} A_{22}^o \rightarrow A_{24}^e \oplus M_{44}^{(3)}$
$A_{24}^e \rightarrow A_{24}^o \oplus M_{44}^{(4)} A_{24}^o \rightarrow A_{24}^e$ When signal beams from the third input port are transmitted to any output port, under the control of the external voltage, the state $M_i^j$ of respective optical switching cell in four optical switching devices is $A_3 \rightarrow B_1: M_{31}^{(1)} A_{31}^e \rightarrow A_{31}^o \oplus M_{31}^{(2)} A_{31}^o \rightarrow A_{31}^o \oplus M_{31}^{(3)}$
$A_{31}^o \rightarrow A_{31}^e \oplus M_{41}^{(4)} A_{31}^e \rightarrow A_{31}^e$ $A_3 \rightarrow B_2: M_{31}^{(1)} A_{31}^e \rightarrow A_{32}^e \oplus M_{32}^{(2)} A_{32}^e \rightarrow A_{32}^o \oplus M_{32}^{(3)}$
$A_{32}^o \rightarrow A_{32}^o \oplus M_{42}^{(4)} A_{32}^o \rightarrow A_{32}^e$ $A_3 \rightarrow B_3: M_{31}^{(1)} A_{31}^e \rightarrow A_{31}^o \oplus M_{31}^{(2)} A_{31}^o \rightarrow A_{33}^o \oplus M_{33}^{(3)}$
$A_{33}^o \rightarrow A_{33}^e \oplus M_{43}^{(4)} A_{33}^e \rightarrow A_{33}^e$ $A_3 \rightarrow B_4: M_{31}^{(1)} A_{31}^e \rightarrow A_{31}^e \oplus M_{32}^{(2)} A_{32}^e \rightarrow A_{34}^e \oplus M_{34}^{(3)}$
$A_{34}^e \rightarrow A_{34}^e \oplus M_{44}^{(4)} A_{34}^e \rightarrow A_{34}^e$ When signal beams from the fourth input port are transmitted to any output port, under the control of the external voltage, the state $M_i^j$ of respective optical switching cell in four optical switching devices is $A_4 \rightarrow B_1: M_{41}^{(1)} A_{41}^e \rightarrow A_{41}^o \oplus M_{41}^{(2)} A_{41}^o \rightarrow A_{41}^o \oplus M_{41}^{(3)}$
$A_{41}^o \rightarrow A_{41}^o \oplus M_{41}^{(4)} A_{41}^o \rightarrow A_{41}^e$ $A_4 \rightarrow B_2: M_{41}^{(1)} A_{41}^e \rightarrow A_{42}^e \oplus M_{42}^{(2)} A_{42}^e \rightarrow A_{42}^o \oplus M_{42}^{(3)}$
$A_{42}^o \rightarrow A_{42}^o \oplus M_{42}^{(4)} A_{42}^o \rightarrow A_{42}^e$ $A_4 \rightarrow B_3: M_{41}^{(1)} A_{41}^e \rightarrow A_{41}^o \oplus M_{41}^{(2)} A_{41}^o \rightarrow A_{43}^e \oplus M_{43}^{(3)}$
$A_{43}^o \rightarrow A_{43}^o \oplus M_{43}^{(4)} A_{43}^o \rightarrow A_{43}^e$ $A_4 \rightarrow B_4: M_{41}^{(1)} A_{41}^e \rightarrow A_{42}^e \oplus M_{42}^{(2)} A_{42}^e \rightarrow A_{44}^e \oplus M_{44}^{(3)}$
$A_{44}^o \rightarrow A_{44}^o \oplus M_{44}^{(4)} A_{44}^o \rightarrow A_{44}^e$ 3. As compared with a bidirection 4×4 routing matrix switching device shown in FIGS. 2(A) and 2(B), in an unidirection 4×4 routing matrix switching device shown in FIGS. 2a(A) and 2a(B), both of section optical switching array LC4 and the unit V of converting linear polarization beams into random polarization beams are left out. The routing procedure of transmitting signal beams from each input port to any output port is dependent on the states of optical switching cells in three switching array devices.

$$\begin{bmatrix} M_{11}^{(1)} A_{11}^e & M_{21}^{(1)} A_{21}^e M_{31}^{(1)} A_{31}^e & M_{41}^{(1)} A_{41}^e \\ M_{11}^{(1)} A_{11}^e & M_{21}^{(1)} A_{21}^e M_{31}^{(1)} A_{31}^e & M_{41}^{(1)} A_{41}^e \end{bmatrix} = \begin{bmatrix} A_{21}^o & A_{22}^o & A_{32}^o & A_{42}^o \\ A_{11}^e & A_{21}^e & A_{31}^e & A_{41}^e \end{bmatrix} \quad (1)$$

$$\begin{bmatrix} M_{12}^{(2)} A_{12}^o, & M_{22}^{(2)} A_{22}^o, & M_{32}^{(2)} A_{32}^o, & M_{42}^{(2)} A_{42}^o \\ M_{11}^{(2)} A_{11}^e, & M_{21}^{(2)} A_{21}^e, & M_{31}^{(2)} A_{31}^e, & M_{41}^{(2)} A_{41}^e \\ M_{12}^{(2)} A_{12}^o, & M_{22}^{(2)} A_{22}^o, & M_{32}^{(2)} A_{32}^o, & M_{42}^{(2)} A_{42}^o \\ M_{11}^{(2)} A_{11}^e, & M_{21}^{(2)} A_{21}^e, & M_{31}^{(2)} A_{31}^e, & M_{41}^{(2)} A_{41}^e \end{bmatrix} = \begin{bmatrix} A_{14}^o, & A_{24}^o, & A_{34}^o, & A_{44}^o \\ A_{13}^o, & A_{23}^o, & A_{33}^o, & A_{43}^o \\ A_{12}^e, & A_{22}^e, & A_{32}^e, & A_{42}^e \\ A_{11}^e, & A_{21}^e, & A_{31}^e, & A_{41}^e \end{bmatrix} \quad (2)$$

$$\begin{bmatrix} M_{34}^{(3)}(A_{14}^o + A_{34}^e), & M_{44}^{(3)}(A_{24}^o + A_{44}^e) \\ M_{33}^{(3)}(A_{13}^o + A_{33}^e), & M_{43}^{(3)}(A_{23}^o + A_{43}^e) \\ M_{32}^{(3)}(A_{12}^o + A_{32}^e), & M_{42}^{(3)}(A_{22}^o + A_{42}^e) \\ M_{31}^{(3)}(A_{11}^o + A_{31}^e), & M_{41}^{(3)}(A_{21}^o + A_{41}^e) \end{bmatrix} = \begin{bmatrix} A_{14}^o + A_{34}^e, & A_{24}^o + A_{44}^e \\ A_{13}^o + A_{33}^e, & A_{23}^o + A_{43}^e \\ A_{12}^o + A_{32}^e, & A_{22}^o + A_{42}^e \\ A_{11}^o + A_{31}^e, & A_{21}^o + A_{41}^e \end{bmatrix} \quad (3)$$

What is claimed is:

1. A method of M×N optical routing matrix switching, where M=$2^m$, N=$2^n$, m, n=0,1,2, . . . comprising:
    converting M divergent signal beams into M collimated signal beams;
    converting said M collimated signal beams into linear polarization signal beams;
    transmitting said linear polarization signal beams through a plurality of routing parallel optical channels;
    constructing M×N parallel transmission optical channels from the M transmitted signal beams in a first direction and N parallel optical channels in a second direction substantially perpendicular to the first direction, wherein the M transmitted signal beams comprise M elements $E_1, E_2, E_3, \ldots, E_M$, and N parallel optical channels comprise N elements $E_1, E_2, E_3, \ldots, E_N$, and wherein M×N parallel transmission optical channels comprise M×N elements $E_{i1}, E_{i2}, E_{i3}, \ldots, E_{iN}$, where i=1, 2, . . . , M;
    selecting a plurality of elements from the M×N elements $E_{1j}, E_{2j}, E_{3j}, \ldots, E_{Mj}$, for the same j, where j=1, 2, . . . , N;
    combining the selected elements for each group of elements having the same j into N parallel output channels in the second direction;
    for a unidirectional matrix switching device, coupling directly signal beams transmitted in the N parallel output channels into N output fibers;
    for a bidirectional matrix switching device, reverting N linear polarization beams output from the N parallel output channels into N random polarization signal beams; and
    coupling the N random polarization signal beams into N output fibers in parallel.

2. An optical matrix switching device performing said M×N optical routing matrix switching method according to claim 1, the optical matrix switching device comprising:
    a routing parallel optical channel assembly comprising an optical collimated unit, a first parallel plane crystal unit and a routing parallel optical channel unit, the optical collimated unit having a one-dimensional fiber array; and a routing combination assembly comprising parallel optical channels and being coupled with the routing parallel optical channel assembly via an optical path in space, wherein the bidirectional matrix switching device respectively includes a λ/2 wavelength plate array, a first routing combination unit comprising parallel optical channels, a second parallel plane crystal unit, and a coupling unit having a one-dimensional fiber array, and wherein the unidirectional matrix switching device respectively includes a λ/2 wavelength plate array, a second routing combination unit comprising parallel optical channels, and a coupling unit having a one dimensional fiber array; wherein an optical switching array in the first routing combination unit and the second parallel plane crystal unit comprises a plurality of stages including a first stage and a last stage, and the last stage is removed.

3. The optical matrix-switching device according to claim 2, wherein:

the optical collimated unit includes a base plate with M parallel V-grooves, in which a micro-capillary with fiber tails and gradient index lenses are closely leant against the front and back of each of the V-grooves so as to construct M parallel optical channels, respectively;

the first parallel plane crystal unit is composed of first, second, third and fourth rectangular parallel plane crystals and first and second wavelength plates, which are arranged in order of the first rectangular parallel plane crystal, the first wavelength plate, the second rectangular parallel plane crystal, the second wavelength plate, and the third and fourth rectangular parallel plane crystals overlapped with each other, wherein, the first wavelength plate is a λ/2 wavelength plate, and the second wavelength plate includes a half upper layer and a half lower layer, the half upper layer being a λ/2 wavelength plate and the half lower layer being a glass base plate of parallel plane and the routing parallel optical channel unit comprises n stages of optical switching arrays and crystal prism units, in which each stage is composed of, in order, one optical switching array and one crystal prism.

4. The optical matrix switching device according to claim 2, wherein:

each of the λ/2 wavelength plate arrays is structured by arranging two pieces of λ/2 wavelength plates and of glass base-plates, in the same size, into square crossing;

each of the first and second routing combination units comprises m stages of crystal prisms and optical switching arrays, in which each stage is composed of, in order, one crystal prism and one optical switching array;

the second parallel plane crystal unit is composed of first, second, third and fourth rectangular parallel plane crystals and first and second wavelength plates, which are the same components as those in said first parallel plane crystal unit, and of which the collocation order is equal to the order formed by the rotation of said first parallel plane crystal unit over 180° along the axis direction of and over 90° along the radial direction of light path; and each of the coupling units comprises a base-plate with N parallel V-grooves, in which gradient index micro-lenses and a micro-capillary with fiber tails are closely leant against the front and back of each of the V-grooves, respectively, so as to construct N parallel optical channels.

5. The optical matrix-switching device according to claim 2, wherein:

said optical collimated unit includes M parallel V-grooves in which a micro-capillary and gradient index micro-lenses are arranged, the spacing of the V-grooves and the outer diameter of the gradient index micro-lenses are all equal to or slightly larger than the outer diameter $d_0$ of the micro-capillary, and a flat base as a cover plate is formed and solidified on the top surface of the entire optical collimated unit;

each of said parallel plane crystal units comprises first, second third and fourth rectangular parallel plane crystals, the first and the second rectangular parallel plane crystals are congeneric crystals with the same size, and the third and the fourth rectangular parallel plane crystals, of which the crystal axes are up-down symmetrical with each other, are congener crystals with the same size as well;

said routing parallel optical channel unit comprises a plurality of stages of optical switching arrays, each stage of optical switching arrays has $2^m \times 2^i$ (i=0,1, 2,..., n−1) cells, i is order number of each stage in said routing parallel optical channel unit, and each cell, under an external control, can exhibit one of two states corresponding to natures of a glass medium and a λ/2 wavelength plate, or one of three states corresponding to natures of a glass medium, a λ/2 wavelength plate and a λ/4 wavelength plate;

each of said routing combination units comprises a plurality of stages of optical switching arrays, each stage of optical switching arrays has $2^j \times 2^m$ (j=m−1,..., 2,1,0) cells, j is order number of each stage in the routing combination units and each cell, under an external control, can exhibit one of two states corresponding to natures of a glass medium and a λ/2 wavelength plate, or one of three states corresponding to natures of a glass medium, a λ/2 wavelength plate and a λ/4 wavelength plate; and each of said coupling units is structured as such that the spacing of the V-grooves and the outer diameter of the gradient index micro-lenses are all equal to or slightly larger than the outer diameter $d_0$ of the micro-capillary, and a flat base as a cover plate is formed and solidified on the top surface of each of the entire coupling units.

6. The optical matrix switching device according to claim 2, wherein said routing parallel optical channel unit comprises an optical switching array and a crystal prism, wherein said optical switching array is an optical switching array device of movable wavelength plate and a liquid-crystal optical switching array device as well; and wherein said crystal prism is a trapezoid polarization prism as well as a birefringence crystal prism.

* * * * *